US010698670B2

(12) United States Patent
Kasahara et al.

(10) Patent No.: US 10,698,670 B2
(45) Date of Patent: Jun. 30, 2020

(54) PARALLEL PROGRAM GENERATING METHOD AND PARALLELIZATION COMPILING APPARATUS

(71) Applicant: WASEDA UNIVERSITY, Tokyo (JP)

(72) Inventors: Hironori Kasahara, Tokyo (JP); Keiji Kimura, Tokyo (JP); Dan Umeda, Tokyo (JP); Hiroki Mikami, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 85 days.

(21) Appl. No.: 15/856,306

(22) Filed: Dec. 28, 2017

(65) Prior Publication Data
US 2018/0181380 A1    Jun. 28, 2018

(30) Foreign Application Priority Data

Dec. 28, 2016  (JP) ................................ 2016-255938
Sep. 15, 2017  (JP) ................................ 2017-178110

(51) Int. Cl.
*G06F 8/41* (2018.01)

(52) U.S. Cl.
CPC .............. *G06F 8/456* (2013.01); *G06F 8/425* (2013.01); *G06F 8/433* (2013.01); *G06F 8/452* (2013.01)

(58) Field of Classification Search
CPC ... G06F 8/41; G06F 8/425; G06F 8/43; G06F 8/433; G06F 8/45; G06F 8/452; G06F 8/456
USPC ........ 717/140, 141, 144, 149, 151, 154–156
See application file for complete search history.

(56) References Cited

U.S. PATENT DOCUMENTS

| 5,539,888 A * | 7/1996 | Byers ................. G06F 9/30058 712/234 |
| 5,812,811 A * | 9/1998 | Dubey ................. G06F 9/3009 712/200 |
| 5,822,593 A * | 10/1998 | Lamping ................. G06F 8/30 717/161 |
| 6,832,370 B1 * | 12/2004 | Srinivasan ............ G06F 8/4452 712/241 |

(Continued)

FOREIGN PATENT DOCUMENTS

| JP | 2015-001807 | 1/2015 |
| WO | 2008/041442 | 4/2008 |

OTHER PUBLICATIONS

Yuan Xie and W. Wolf, "Allocation and scheduling of conditional task graph in hardware/software co-synthesis," Proceedings Design, Automation and Test in Europe. Conference and Exhibition 2001, Munich, Germany, 2001, pp. 620-625. (Year: 2001).*

(Continued)

*Primary Examiner* — Andrew M. Lyons
(74) *Attorney, Agent, or Firm* — Rankin, Hill & Clark LLP

(57) ABSTRACT

There is provided a parallel program generating method capable of generating a static scheduling enabled parallel program without undermining the possibility of extracting parallelism. The parallel program generating method executed by the parallelization compiling apparatus 100 includes a fusion step (FIG. 2/STEP026) of fusing, as a new task, a task group including a reference task as a task having a conditional branch, and subsequent tasks as tasks control dependent, extended-control dependent, or indirect control dependent on respective of all branch directions of the conditional branch included in the reference task.

11 Claims, 20 Drawing Sheets

(56) References Cited

U.S. PATENT DOCUMENTS

| | | | | |
|---|---|---|---|---|
| 8,572,590 B2* | 10/2013 | Lethin | G06F 8/452 | 717/143 |
| 8,677,338 B2* | 3/2014 | Ng | G06F 8/4441 | 717/151 |
| 8,755,515 B1* | 6/2014 | Wu | H04M 5/00 | 379/284 |
| 8,930,926 B2* | 1/2015 | Bastoul | G06F 8/453 | 717/119 |
| 9,348,587 B2* | 5/2016 | Vorbach | G06F 9/30043 | |
| 2004/0083468 A1* | 4/2004 | Ogawa | G06F 8/433 | 717/151 |
| 2005/0188364 A1* | 8/2005 | Cockx | G06F 8/456 | 717/159 |
| 2006/0070047 A1* | 3/2006 | Narayanasamy | G06F 8/443 | 717/144 |
| 2007/0255929 A1* | 11/2007 | Kasahara | G06F 1/3203 | 712/1 |
| 2007/0283358 A1* | 12/2007 | Kasahara | G06F 9/5044 | 718/104 |
| 2009/0055630 A1* | 2/2009 | Isshiki | G06F 8/456 | 712/216 |
| 2009/0307660 A1* | 12/2009 | Srinivasan | G06F 8/314 | 717/114 |
| 2010/0199257 A1* | 8/2010 | Biggerstaff | G06F 8/456 | 717/104 |
| 2010/0269102 A1* | 10/2010 | Latorre | G06F 9/3842 | 717/130 |
| 2010/0325608 A1* | 12/2010 | Radigan | G06F 8/456 | 717/106 |
| 2012/0167068 A1* | 6/2012 | Lin | G06F 8/4434 | 717/160 |
| 2012/0167069 A1* | 6/2012 | Lin | G06F 8/456 | 717/160 |
| 2014/0310696 A1* | 10/2014 | Vorbach | G06F 17/5054 | 717/151 |
| 2014/0372995 A1* | 12/2014 | Mori | G06F 8/452 | 717/146 |
| 2015/0058832 A1* | 2/2015 | Gonion | G06F 8/433 | 717/150 |
| 2015/0363230 A1* | 12/2015 | Kasahara | G06F 9/4881 | 718/106 |
| 2016/0291950 A1* | 10/2016 | Yatou | G06F 8/458 | |

OTHER PUBLICATIONS

A. Yoshida, S. Maeda, K. Fujimoto and H. Kasahara, "A data-localization scheme using task-fusion for macro-dataflow computation," IEEE Pacific Rim Conference on Communications, Computers, and Signal Processing. Proceedings, Victoria, BC, Canada, 1995, pp. 135-140. (Year: 1995).*

European Search Report dated Jun. 1, 2018, 9 pages.

* cited by examiner

FIG.7

| Macrotask | Earliest executable conditions |
|---|---|
| BB1 | |
| BB2 | $BB1_2$ |
| BB3 | $BB2_3$ |
| BB4 | $BB1_2$ |
| BB5 | |
| BB6 | BB3 or $BB1_5$ or $BB2_4$ |
| BB7 | |
| BB8 | $BB7_8$ |
| BB9 | $BB8_9$ |
| BB10 | $BB7_8$ |
| BB11 | |
| BB12 | BB9 or $BB7_{11}$ or $BB8_{10}$ |
| BB13 | |

$MTi_j$ : MTi branches to MTj and MTi completes execution.

FIG.13

| Macrotask | Earliest executable conditions |
|---|---|
| BB1 | |
| BB2 | $BB1_2$ |
| BB3 | $BB2_3$ |
| BB4 | $BB1_2$ |
| BB5 | $BB1_5$ |
| BB6 | BB3 or $BB1_5$ or $BB2_4$ |
| BB7 | |
| BB8 | $BB7_8$ |
| BB9 | $BB8_9$ |
| BB10 | $BB7_8$ |
| BB11 | $BB7_{11}$ |
| SB12 | BB9 or $BB7_{11}$ or $BB8_{10}$ |
| BB13 | |

$MTi_j$ : MTi branches to MTj and MTi completes execution.

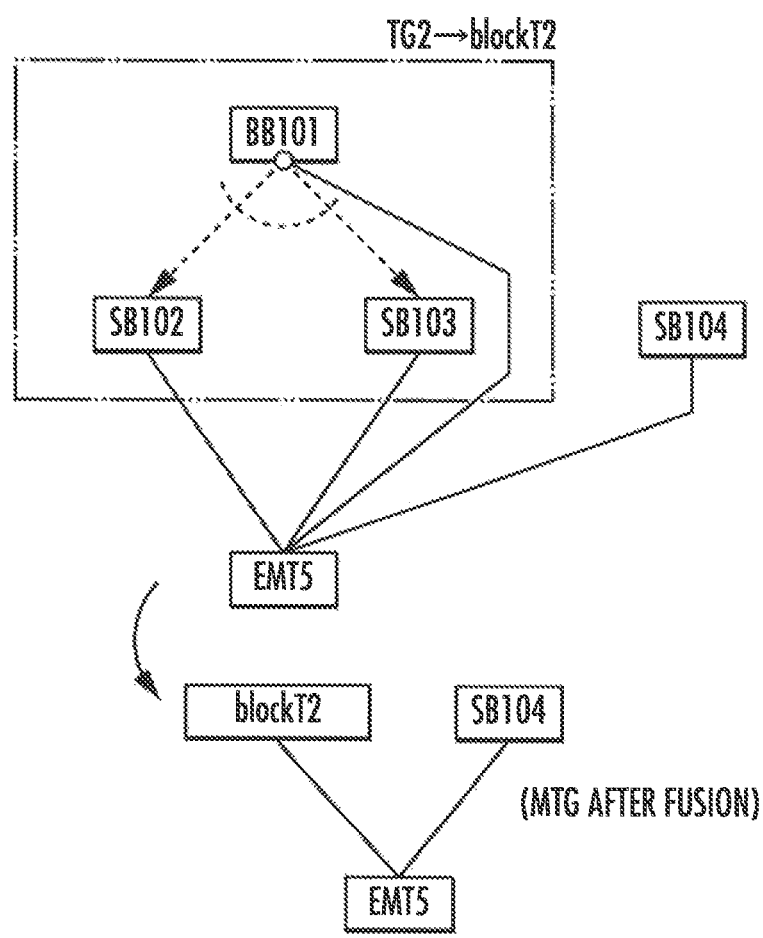

PARALLEL PROGRAM GENERATING METHOD AND PARALLELIZATION COMPILING APPARATUS

BACKGROUND OF THE INVENTION

Field of the Invention

The present invention relates to a parallel program generating method and a parallelization compiling apparatus.

Description of the Related Art

Conventionally, a parallelization compiler has been known, which generates a parallel program for a multiprocessor system from a sequential program sequentially executed by a single processor system.

For parallelization processing by this type of parallelization compiler, scheduling processing to assign each task to any of processing elements (which may be abbreviated as "PE" below) is indispensable. As the scheduling processing, static scheduling to assign each task to any of the processing elements at the time of generating a parallel program, and dynamic scheduling to assign each task to any of the processing elements at the time of program execution are known.

The dynamic scheduling is a scheduling technique set in a parallel program to be started when a sequential program having tasks including a conditional branch is parallelized and executed on a multiprocessor system. However, when the execution time of individual task processing following the conditional branch is short, the time of scheduling processing to assign the individual task to any of processing elements that constitute the multiprocessor system at the execution time, that is, overhead becomes relatively large, and this makes it difficult to increase the speed by the parallel execution. For example, when the execution time of the tasks including the conditional branch and subsequent processing is a 10-clock cycle and the execution time of the scheduling processing is a 1000-clock cycle, the parallel execution results in requiring more execution time by contraries. On the other hand, in the case of static scheduling, processing for assigning, to each PE, each task parallelly executable at the stage of generating the parallel program by the parallelization compiler is performed, and the time of scheduling processing is not required when the parallel program runs on the multiprocessor system (note that a short time is required for synchronization processing between PEs to be parallelly executed in a precise sense). Therefore, it is desired to use a static scheduling technique when the sequential program is parallelized to speed up the processing. In such a sense, in this specification, the phrase "parallelly executable" is used to correspond to "static scheduling enabled" unless otherwise specified, and even a similar phrase "parallel execution" is not used in the meaning of corresponding to "dynamic scheduling."

However, when a sequential program composed mainly of a conditional branch, a function call, and an assignment statement without any loop structure, for example, a sequential program for an embedded system of a vehicle-mounted control device is parallelized to run on a multiprocessor system, static scheduling has not been able to be used until relatively recently.

In view of such a point, a method of using the static scheduling technique to convert a sequential program for an embedded system, composed mainly of a conditional branch, a function call, and an assignment statement, into a parallel program, and a parallelization compiler that embodies the method as software have been proposed. This method is a method of integrating the conditional branch and subsequent tasks into one task, and assigning this task to each individual processing element using the static scheduling when plural tasks of this type can be generated and these tasks are parallelly executable. According to this method, since the conditional branch is hidden in the integrated one task and executed in one processing element, there is no need to use dynamic scheduling.

As one of such parallelization compilers, there is proposed a parallelization compiler to cause a computer to execute the following processes (1) to (6) in order to parallelize a sequential program for an embedded system of an on-vehicle device (see Patent Literature 1).

(1) The sequential program is divided into plural tasks based on the results of lexical analysis and syntax analysis. Here, each task is composed of one or more statements. The task is classified into any one of three kinds of coarse grain tasks, i.e., a basic block (BB) including a continuous assignment and a conditional branch, a repetition block (RB) including repeated execution, and a subroutine block (SB) including a function.

(2) Based on control dependence between respective tasks (corresponding to "control flow" in this specification), a task having processing to branch to a different task is identified as a start task, and any one of tasks executed in common in all of plural processes of a series of processing to be executed sequentially by using the start task as a start point is identified as an end task. Here, the "control flow" means a processing path decided by the order, the conditional branch, and the like, written in the sequential program.

(3) The identified start task, the end task in the processing using the start task as the start point, and all tasks executed after the execution of the start task and before the execution of the end task are fused as a new task.

(4) Data dependence (corresponding to "data dependency" in this specification) and control dependence between tasks including the new task after the fusion are analyzed. Then, based on the data dependence and control dependence between tasks, tasks parallelly executable are extracted by plural processor units (corresponding to "processing elements PEs" in this specification; the same applies to the below) that constitute a multiprocessor system mounted in an on-vehicle device.

(5) Static scheduling to assign each of the tasks to any one of the processor units is performed so that the tasks parallelly executable are executed by different processor units in parallel.

(6) Based on the results of the static scheduling, a parallel program is generated.

According to the parallelization compiler, even in the sequential program including a conditional branch, a task including branch processing is identified as the start task, any one of tasks executed in common in all of plural processes of a series of processing to be executed sequentially by using the start task as a start point is identified as the end task, and a series of tasks including the start task and the end task are fused as a new task. This new task is assigned to any one of the processor units by the static scheduling.

According to the parallelization compiler in Patent Literature 1, even when a sequential program including many conditional branches such as that the execution time of each subsequent task is short is parallelized, since each macro task is assigned by the static scheduling to any one of the processor units, the overhead of the scheduling processing can be prevented from increasing upon execution, and this can lead to automatically generating a parallel program capable of being processed at high speed.

[Patent Literature 1] Japanese Patent Application Laid-Open No. 2015-001807

SUMMARY OF THE INVENTION

However, the parallelization compiler in Patent Literature 1 has room for improvement. For example, the parallelization compiler in Patent Literature 1 decides on the start task and the end task based on the control flow, and the start task, the end task, and all tasks to be executed therebetween are fused (grouped) into one task. However, among plural fusion-target tasks to be executed after the execution of the start task and before the execution of the end task, there is a possibility that parallelly executable tasks exist. If plural tasks parallelly executable are fused, the possibility of extracting the parallelly executable tasks could be undermined.

In view of this problem, it is an object of the present invention to provide a parallel program generating method and a parallelization compiling apparatus capable of resolving such a problem in Patent Literature 1 and extracting parallelly executable tasks.

Next, the key terms "data dependency (between tasks)," "control dependency (of a task)," and "task fusion" used in the present invention are described below. Note that the other terms are also described as necessary in the following description.

First, the meaning of "data dependency" between tasks is described. As is well known, when there is data dependency between a statement included in one preceding task and a statement included in the other subsequent task, the other task is called to be data dependent on the one task. In this case, if there is even one data dependency between statements respectively included in two tasks, it turns out that there is data dependency between two tasks. When there is data dependency between the tasks, the execution of the other subsequent task can be started after completion of the execution of all statements in the one preceding task, which have data dependency relationships with statements included in the other subsequent task. However, on the analysis of data dependency between tasks in an actual program, it is meant that "the other task is data dependent on the one task" on condition that the execution of the other task should not be started until completion of the execution of the one task" while taking into account the meaning as mentioned above. In other words, in the analysis of such data dependency, when there is "data dependency (between tasks)," the execution order of one preceding task and the other subsequent task defined in the sequential program cannot be changed in the course of parallelization.

Here, the "data dependency between statements" means that at least any one of the following dependency relationships (A) to (C) is established.

(A) A variable defined by a preceding statement is used by a subsequent statement (which is called "flow dependency"). The definition of a variable means that a numerical value is assigned to the variable, and use of the variable means to refer to the value of the variable. The following is an example.

Preceding statement: var=a
Subsequent statement: X=var (B) The variable defined by the preceding statement is redefined by the subsequent statement (which is called "output dependency"). The redefinition means that a new numerical value is assigned to a variable already defined. The following is an example.

Preceding statement: var=a
Subsequent statement: var=b (C) A variable used by the preceding statement is defined by the subsequent statement (which is called "reverse dependency"). The following is an example.

Preceding statement: X=var
Subsequent statement: var=c

In this case, the variable used by the preceding statement is defined by a further preceding statement.

As described above, when the execution order of both statements in a relationship of flow dependency, output dependency, or reverse dependency is reversed, since the results of operations become different from each other, there is a need not to change this execution order in the course of parallelization.

Next, the meaning of "control dependency" of a task is described. The control dependency of a task is related to a dependency relationship of a task subsequent to a specific branch direction of a conditional branch. When the execution of a task subsequent to one branch direction is determined on condition that the branch direction of the conditional branch is determined to be the one branch direction, it is said that the subsequent task is control dependent on the one branch direction of the conditional branch.

The (control) dependency relationship of a task may also appear in association with data dependency between tasks. Although the details are given in the description of the embodiment, an example is given here.

For example, a case is considered where a variable is defined by a statement included in a first task to be executed when the branch direction of a conditional branch having two branch directions is determined to be a first branch direction, and the variable is redefined by a statement included in a second task to be executed when the branch direction of the conditional branch is either of the branch directions, i.e., where the statement included in the second task is output dependent on the statement included in the first task.

In other words, the first task is control dependent on the first branch direction of the conditional branch, and the second task is data dependent on the first task. Since the second task is executed when the branch direction of the conditional branch is either of the branch directions, the second task is not control dependent on either of the branch directions of the conditional branch.

In this case, when the branch direction of the conditional branch is determined to be the first branch direction, the first task is executed as will be understood, and the second task, which is data dependent on the first task, can also be executed. In this example, the variable defined by the statement included in the first task is redefined by the statement included in the second task. On the other hand, when the branch direction is determined to be the second branch direction different from the first branch direction, the non-execution of the first task is determined, and this enables the second task to be executed without taking into account the execution order relation with the first task. In this case, although the variable is not defined in the first task, there is no problem with the execution because the variable is redefined by the statement included in the second task.

In other words, it is also said that the data dependency of the second task on the first task is resolved by determining the branch direction of the conditional branch to be the second branch direction.

In the above, the case where there is data dependency called "output dependency" between the first and second tasks is described, but the case of "reverse dependency" is the same as the case of "output dependency" because the variable is defined in the second task. However, when the "data dependency" between both statements described above is "flow dependency," the non-execution of the first task is determined by determining the branch direction of the conditional branch to be the second branch direction on condition that the variable used in the second task is defined before the second branch direction is determined, and this enables the second task to be executed without taking into account the execution order relation with the first task.

Thus, the data dependency of the second task on the first task is resolved by determining the branch direction of the conditional branch to be the second branch direction, and this enables the start of execution of the second task. In other words, the second task is not control dependent on any of the branch directions of the conditional branch, and can be executed in parallel with the conditional branch if there is no data dependency on the first task. However, since the second task is data dependent on the first task, the second task cannot be executed until the first task is completed or the branch direction of the conditional branch is determined to be the second branch direction. In such a case, it is said that the second task is extended-control dependent on the second branch direction of the conditional branch.

As described above, such conditions as to enable a task to be executed can be represented by data dependency, control dependency, and a combination of them. In other words, data dependency, control dependency, and extended-control dependency are such conditions that a program after the sequential program is subjected to parallelization generates the same operation results as those of the original sequential program. Therefore, upon parallelization of the sequential program, it is important to figure out dependency relationships among tasks that constitute the sequential program.

Then, the meaning of "task fusion" is described. The "task fusion" means that a task group including plural tasks associated with one another is defined as one new task. The new task generated by this "task fusion" can be assigned to one PE in scheduling upon generation of a parallel program. Further, unlike code fusion such as "loop fusion" as the fusion of repetition blocks, the structure and function of each of the plural tasks to be fused are kept intact and are never changed in this "task fusion."

In order to solve the above-described problem, a parallel program generating method of the present invention causes a computer to generate, from a sequential program, a parallel program executable in a system including a plurality of arithmetic processing units to perform arithmetic processing, the computer comprising a memory unit for storing parallelization compiler and an arithmetic processing element, the arithmetic processing element functions as a task division element, a dependency analysis element, and a fusion element by executing the parallelization compiler, wherein:

the task division element executes a task division step of dividing the sequential program into a plurality of tasks;

the dependency analysis element executes a dependency analysis step of analyzing the plurality of tasks divided by the task division element to determine data dependency and control dependency of each of the plurality of tasks; and the fusion element executes a fusion step of determining, based on the data dependency and the control dependency analyzed by the dependency analysis element, as a task group to be fused, a task group including, among the plurality of tasks, a reference task as a task having a conditional branch, and all subsequent tasks as tasks control dependent, extended-control dependent, or indirect control dependent on respective of all branch directions of the conditional branch included in the reference task, and fusing, as a new task, the task group to be fused.

In this specification, such an expression that "a task is indirect control dependent on any of branch directions of a conditional branch" means that control dependency or extended-control dependency is repeated twice or more between the task and a certain branch direction of the conditional branch. For example, when task D including conditional branch C is control dependent on certain branch direction B of conditional branch A and task F is extended-control dependent on certain branch direction E of conditional branch C, control dependency or extended-control dependency is repeated twice between branch direction B of conditional branch A and task F. In such a case, task F is represented to be indirect control dependent on branch direction B of conditional branch A. Although indirect control dependency is a concept different from those of control dependency and extended-control dependency, the indirect control dependency can be derived from a combination of relationships between data dependency and control dependency like the extended-control dependency.

According to the parallel program generating method of the present invention, the task division element executes the task division step to divide a task included in the sequential program into a plurality of tasks.

Then, the dependency analysis element executes the dependency analysis step on the plurality of tasks to analyze data dependency and control dependency of each of the plurality of tasks.

Based on this analysis result, the fusion element executes the fusion step to fuse, as one new task, a task group including a reference task having a conditional branch, and all subsequent tasks control dependent, extended-control dependent, or indirect control dependent on respective of all branch directions of the conditional branch of the reference task.

In this specification, when plural "subsequent tasks" exist, the subsequent tasks may also be called a "subsequent task group."

Thus, since the task group is fused as one task in the fusion step, the task group including the reference task having the conditional branch and all the subsequent tasks control dependent, extended-control dependent, or indirect control dependent on respective of all branch directions of the conditional branch is handled as one task, and the conditional branch is hidden in the one task.

Since it is generally difficult to extract further parallelly executable tasks from the task group including the reference task having the conditional branch and the subsequent tasks as tasks control dependent, extended-control dependent, or indirect control dependent on respective of all branch directions of the conditional branch and achieve parallel execution by static scheduling unless the subsequent tasks satisfy a predetermined condition to be described later, the possibility of extracting parallelism between tasks is not undermined even when these tasks are handled as one task. Thus, according to the compiler of the present invention, a static scheduling enabled parallel program capable of selecting a task group to be handled as one task can be generated in terms of not undermining the possibility of extracting parallelism between tasks.

It is preferred that according to the parallel program generating method of the present invention, the arithmetic processing element functions as a scheduling element and a generation element by executing the parallelization compiler, wherein:

the scheduling element executes a scheduling step of performing scheduling to assign each of a plurality of tasks including the new task to each of the plurality of arithmetic processing units based on the data dependency analyzed by the dependency analysis element; and the generation element executes a generation step of generating the parallel program based on the scheduling results scheduled by the scheduling element.

According to the parallel program generating method having this configuration, the data dependency between plural tasks is determined in the dependency analysis step. Then, in the scheduling step after the execution of the "fusion step," the scheduling element assigns each of the plurality of tasks including the new task to any one of the arithmetic processing units based on the data dependency between tasks, and the generation element generates a parallel program based on the scheduling results.

As described above, according to the parallel program generating method of the present invention, since scheduling is performed by taking into account the data dependency, the control dependency, and the extended-control dependency, a more suitable parallel program is generated in terms of enabling static scheduling without undermining the possibility of extracting parallelism between tasks.

It is also preferred that according to the parallel program generating method having this configuration, the dependency analysis element executes an earliest executable condition analyzing step of analyzing an earliest executable condition of each of the plurality of tasks based on the data dependency between respective tasks and the control dependency of each task obtained in the analysis of the data dependency and the control dependency included in the dependency analysis step.

According to the parallel program generating method having this configuration, the earliest executable condition is analyzed based on the data dependency between respective tasks and the control dependency of each task. Thus, the parallelization compiler can be made consistent with the conventional parallelization technique.

It is further preferred that according to the parallel program generating method of the present invention, arithmetic processing element functions as a fusion-target task group determination element by executing the parallelization compiler, the fusion-target task group determination element executes:

a first identification step of identifying a task group including the reference task, and all first subsequent tasks as tasks control dependent or extended-control dependent on respective of all the branch directions of the conditional branch included in the reference task;

a second identification step of adding, to the task group, all second subsequent tasks as tasks control dependent or extended-control dependent on respective of all branch directions of conditional branches included in the task group determined by the fusion-target task group determination element;

a control step of repeating the second identification step until tasks control dependent or extended-control dependent on any of the branch directions of the conditional branches included in the task group run out; and a fusion-target task group determination step of determining the task group to be a task group to be fused.

According to the parallel program generating method having this configuration, tasks control dependent or extended-control dependent on respective of all branch directions of conditional branches included in any of the reference task and the first subsequent tasks or the second subsequent tasks are repeatedly added to a task group(s) to identify a task group in which all the conditional branches included in these tasks are hidden and fuse this task group as one new task. As a result, plural tasks are extracted as a "task group to be fused" from a sequential program with few loop structures difficult to be parallelized depending on the static scheduling and having many conditional branches, and the "task group to be fused" is fused as one new task.

As described above, a more suitable parallel program is generated in terms of enabling static scheduling without undermining the possibility of extracting parallelism between tasks.

In addition, since tasks control dependent or extended-control dependent on respective of all the branch directions of the conditional branches included in any of the reference task and the first subsequent tasks or the second subsequent tasks are repeatedly extracted, a task group can be extracted while reducing the amount of calculation.

It is further preferred that according to the parallel program generating method, the arithmetic processing element functions as a condition determination element by executing the parallelization compiler, the condition determination element executes:

a condition determination step of determining whether a plurality of tasks control dependent, indirect control dependent, or extended-control dependent on one branch direction of the conditional branch included in the reference task included in the task group to be fused satisfy a predetermined condition including such a parallelly executable condition as to have no control dependency, indirect control dependency, extended-control dependency, and data dependency on one another; and when the predetermined condition is determined not to be satisfied in the condition determination step, the fusion element executes a fusion step of fusing the task group to be fused as the new task, or when the predetermined condition is determined to be satisfied in the condition determination step, the fusion element executes a duplication step of duplicating the conditional branch included in the reference task, a following step of making the plurality of tasks having no control dependency, indirect control dependency, extended-control dependency, and data dependency on one another follow respective of a plurality of conditional branches including the duplicated conditional branch, and a step of combining each of the plurality of conditional branches with the plurality of tasks, each of which is made to follow each of the plurality of conditional branches to generate a plurality of task groups, determining the plurality of task groups as a new plurality of task groups to be fused, and fusing, as the new task, each of the plurality of tasks groups to be fused.

According to the parallel program generating method having this configuration, the computer executes the condition determination step to determine whether the plurality of tasks control dependent, indirect control dependent, or extended-control dependent on one branch direction of the conditional branch included in the reference task satisfy such a predetermined condition as to make the plurality of tasks parallelly executable. Then, when the predetermined condition is determined not to be satisfied in the condition determination step, the fusion step is executed on the "task group to be fused" including the reference task and subsequent tasks. When a plurality of new tasks generated in this fusion step exist and these new tasks have no control dependency, indirect control dependency, extended-control dependency, and data dependency on one another, the plurality of new tasks can be assigned to separate PEs, respectively. Even when only one new task exists, if tasks having no control dependency, indirect control dependency, extended-control dependency, and data dependency on one another exist separately, these tasks are executable in parallel with each other.

On the other hand, when the predetermined condition is determined to be satisfied in the condition determination step, the computer executes the duplication step to duplicate the conditional branch included in the reference task. Then, the computer executes the following step to make the plurality of tasks having no control dependency, indirect control dependency, extended-control dependency, and data dependency on one another follow different conditional branches, respectively. Thus, since parallelly executable tasks are included in "task groups to be fused" together with respectively different conditional branches, and the plurality of "task groups to be fused" are fused into new tasks, respectively, the new tasks can be assigned to separate processing elements, respectively. Thus, the possibility of extracting parallelism between plural tasks control dependent, indirect control dependent, or extended-control dependent on one branch direction of the conditional branch included in the reference task is not undermined.

Here, as the predetermined condition, such a condition that "parallelly executable tasks exist in the task group to be fused" is first set. For the purpose of the present invention, it is important to analyze whether parallelly executable tasks to be described later exist even in the task group to be fused in terms of extracting as many parallelly executable tasks as possible from the original sequential program.

As described above, according to the parallel program generating method having this configuration, a more suitable parallel program is generated in terms of enabling static scheduling without undermining the possibility of extracting parallelism between tasks.

BRIEF DESCRIPTION OF THE DRAWINGS

FIG. 7 is a table illustrating earliest executable conditions for each task in the MFG of FIG. 6.

FIG. 11A illustrates a macro task graph before the duplication, which includes basic blocks BB7 to BB10 and a basic block BB12 in FIG. 8 with external edges omitted, and FIG. 11B illustrates a macro task graph after the duplication of the conditional branch (reference task).

FIG. 13 is a table illustrating earliest executable conditions for each task in the MFG of FIG. 12.

FIG. 14A illustrates an MTG fused without duplicating a conditional branch, FIG. 14B illustrates a fused MTG when the conditional branch is duplicated, and FIG. 14C illustrates an MTG after tasks are fused by the conventional technique.

FIG. 17A illustrates a macro task graph before the duplication, which includes basic blocks BB7 to BB11 and a basic block BB12 in FIG. 15 with external edges omitted, and FIG. 17B illustrates a macro task graph after the duplication of the conditional branch (reference task).

FIG. 18A illustrates an MTG fused without duplicating a conditional branch, FIG. 18B illustrates a fused MTG when the conditional branch is duplicated, and FIG. 18C is an MTG after tasks are fused by the conventional technique.

FIG. 20 is a diagram illustrating an MTG generated based on the MFG of FIG. 19 to describe the principle of the present invention.

DESCRIPTION OF THE PREFERRED EMBODIMENTS

Figure 1:
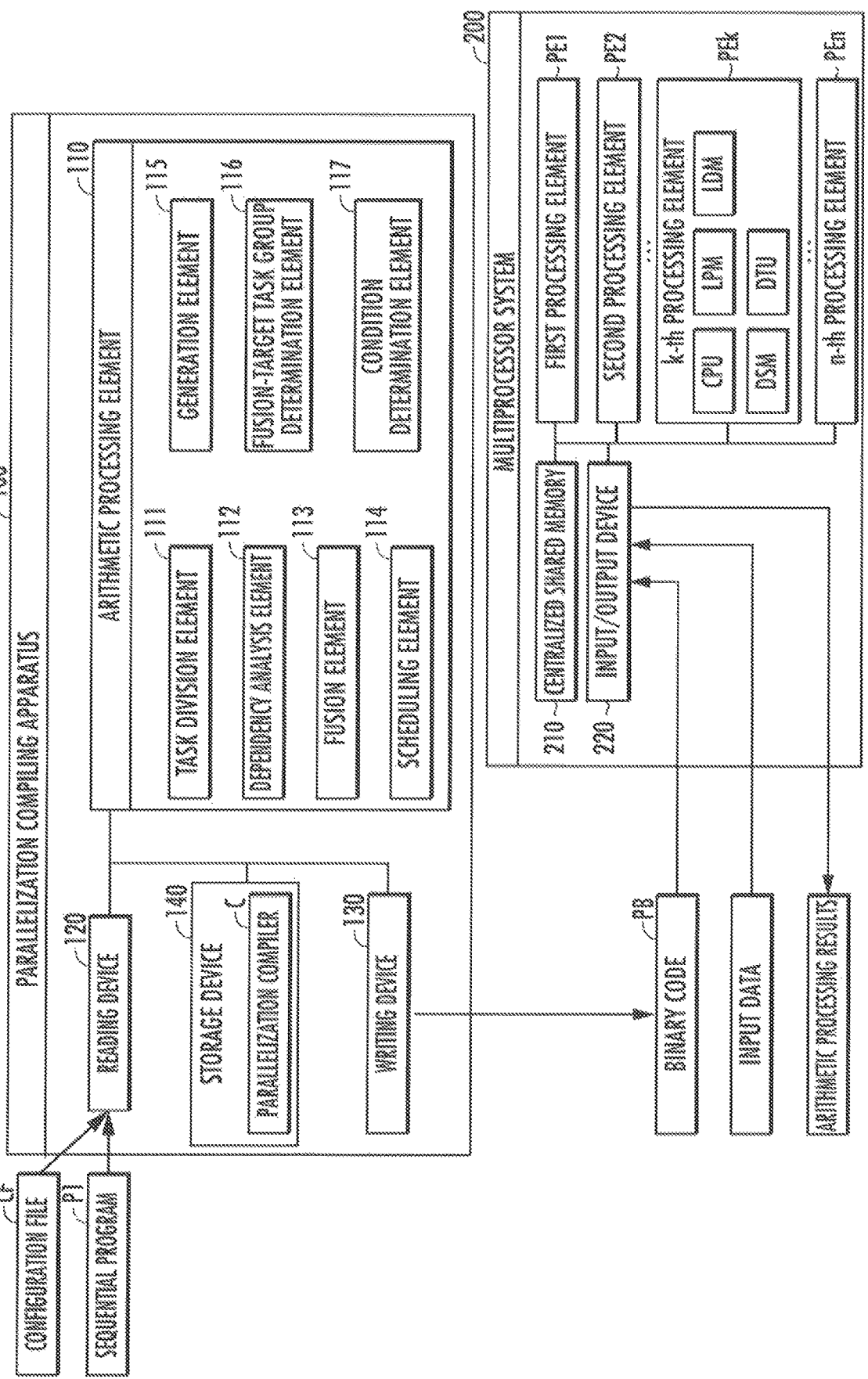
FIG. 1 is an entire configuration diagram of one embodiment.

Referring to FIG. 1 to FIG. 18, an embodiment of the present invention is described.

(Configuration of Compiling Apparatus)

A parallelization compiling apparatus 100 is an apparatus configured to receive, as input, a sequential program P1 sequentially executable in a single processor system and a configuration file CF, and output binary code PB parallelly executable in a multiprocessor system 200. The parallelization compiling apparatus 100 corresponds to an example of a "computer" of the present invention.

In order to implement this function, the parallelization compiling apparatus 100 includes an arithmetic processing element 110, a reading device 120, a writing device 130, and a storage device 140.

The arithmetic processing element 110 is configured to include a central processing unit (CPU) or the like to read a parallelization compiler C from the storage device 140 such as a memory in order to function as a task division element 111, a dependency analysis element 112, a fusion element 113, a scheduling element 114, a generation element 115, a fusion-target task group determination element 116, and a condition determination element 117, which perform arithmetic processing for parallelization processing to be described later according to the parallelization compiler C. The arithmetic processing element 110 performs the arithmetic processing according to the parallelization compiler C to perform a series of processing from STEP001 to STEP032 in FIG. 2 or FIG. 3 to be described later. According to this, the parallelization compiling apparatus 100 generates and outputs the parallelly executable binary code PB The reading device 120 is a device that reads information from an external storage medium, which is a CD disk, a DVD disk, or a Blu-ray disk. Instead of the reading device 120, for example, the sequential program P1 and the configuration file CF may be input externally through an input device, such as a keyboard, or a communication device, or the sequential program P1 and the configuration file CF may be read from an external storage medium (USB memory) or the like connected to the parallelization compiling apparatus 100.

The sequential program P1 is source code written in a high-level language such as Fortran or C language.

The configuration file CF is a file in which information necessary to generate a parallel program running on the multiprocessor system 200, such as information on the number of processing elements that constitute the multiprocessor system 200, the type of processor such as a CPU that makes up the processing elements, the memory capacity and access time of a local memory, the memory capacity and access time of a common storage area in the multiprocessor system 200, and the OS installed in the multiprocessor system 200.

When the parallelization compiling apparatus 100 and the multiprocessor system 200 use a common storage device, the parallelization compiling apparatus 100 may refer to the storage device to acquire information recorded in the configuration file CF.

The writing device 130 is a device that writes information to an external storage medium, which is a CD-R disk, a DVD-R disk, or a Blu-ray disk. Instead of the writing device 130, for example, the binary code PB may be output to the outside through a communication device, or the binary code PB may be written to an external storage medium (USB memory) or the like connected to the parallelization compiling apparatus 100.

The binary code PB is an execution program executable by each of the first processing element PE1 to the n-th processing element PEn in the multiprocessor system 200. The first processing element PE1 to the n-th processing element PEn execute the binary code PB to obtain the same processing results as those in the case where (binary code) of the sequential program P1 is executed in the single processor system.

The storage device 140 is composed of memory units (a main memory unit, an auxiliary memory unit, and the like), such as a ROM, a RAM, and an HDD, and an I/O circuit. The storage device 140 includes at least a non-volatile memory. The RAM is a readable and writable volatile memory, the ROM is a read-only nonvolatile memory, and the HDD is a readable and writable nonvolatile memory. In the ROM and the HDD, programs and the like read and executed by the arithmetic processing element 110 are prestored. The RAM is used as a storage area for temporarily storing a program when the arithmetic processing element 110 executes the program stored in the ROM and the HDD, or as a storage area for temporarily storing working data. In addition to or instead of the RAM, the HDD may be used as a storage area for temporarily storing the program, or as a storage area for temporarily storing working data.

In the nonvolatile memory of the storage device 140, the pre-installed parallelization compiler C and the configuration file are stored.

(Configuration of Multiprocessor System)

The multiprocessor system 200 includes PE1 to PEn as n processing elements interconnected with one another by an interconnection network such as bus connection or cross-bus connection, a centralized shared memory 210, and an input/output device 220 for the multiprocessor system. Each of the processing elements corresponds to an example of each of "arithmetic processing units" of the present invention.

The k-th processing element PEk (k=1, . . . , n) includes a central processing unit CPU, a local data memory LDM, a data transfer unit DTU, a distributed shared memory DSM, and a local program memory LPM.

The configuration of the k-th processing element PEk (k=1, . . . , n) may be different from this configuration as long as the processing element can perform predetermined arithmetic processing. For example, the k-th processing element PEk (k=1, . . . , n) may include a cache memory in addition to or instead of the local data memory LDM and the local program memory LPM. The k-th processing element PEk (k=1, . . . , n) may also include a register for clock frequency or power-supply voltage control. Further, the k-th processing element PEk (k=1, . . . , n) may include an accelerator instead of or in addition to the central processing unit CPU. Conversely, for example, all or some of components (LDM, LPM, DSM, DTU) other than the CPU may be omitted. Further, the k-th processing element PEk (k=1, . . . , n) may have a configuration different from the others.

The central processing unit CPU is a general-purpose processor.

The local data memory LDM is a memory unit (composed of a RAM and the like) accessible only from the processing elements including the LDM.

The data transfer unit DTU is a unit for managing data transfer between processing elements, between the k-th processing element PEk and the centralized shared memory 210, or between the k-th processing element PEk and the input/output device 220 of the multiprocessor system.

The distributed shared memory DSM as one of the components of each processing element is a memory unit (composed of a RAM and the like) accessible from other processing elements, but the DSM may not be necessarily provided.

The local program memory LPM stores a program to be executed by the k-th processing element PEk including the LPM (e.g., a program for part of the binary code PB assigned to the k-th processing element PEk).

Some processing elements may include a signal processor (Digital signal processor, which is abbreviated as "DSP") or a dynamically reconfigurable processor (abbreviated as "DRP") instead of the CPU.

The processing elements PE1 to PEn may be grouped into a processing group PG as a hierarchical group. The details of this grouping technique are disclosed in Reference Literature 1, M. Miyazawa, M. Okamoto, and H. Kasahara, "A Subroutine Parallel Processing Scheme for Hierarchical Macro-dataflow Computation," Proc. 48$^{th}$ National Convention of IPSJ, 1994.

Note that the central processing unit CPU, and each of the processing elements PE1 to PEn or the processing group PG correspond to an example of each of the "arithmetic processing units" of the present invention.

The centralized shared memory 210 is composed of memory media (composed of a RAM, a ROM, an HDD, and the like) accessible from each of the processing elements PE1 to PEn.

The input/output device 220 of the multiprocessor system may be a unit for reading information from an external storage medium, which is a CD drive, a DVD drive, or a Blu-ray drive. Instead of the input/output device 220 of the multiprocessor system, for example, the binary code PB may be externally input to the multiprocessor system 200 through a communication device, or the binary code PB may be input to the multiprocessor system 200 by being directly written to a memory unit (the centralized shared memory 210 or the local program memory LPM) of the multiprocessor system. Further, as will be understood, the input/output device 220 has the functions of reading data, on which arithmetic processing is performed in the multiprocessor system, and outputting the arithmetic processing results.

Particularly, when the multiprocessor system 200 is used to control a control target such as a vehicle, the input/output device 220 of the multiprocessor system has the functions of reading information data (e.g., the number of revolutions and temperature of a vehicle engine, and the like), which indicate the states of a control target necessary for the control, as binary data in real time, and outputting control information data in real time to control the control target after being subjected to arithmetic processing by a parallel program.

As described above, the multiprocessor system including the processing elements PE1 to PEn or the processing group PG, in which the processing elements are grouped, and further including a shared storage device and the input/output device corresponds to a "system" configured to execute a parallel program generated by a parallelization compiler of the present invention. Note that the "system" of the present invention is not limited to the multiprocessor system integrated on one semiconductor chip or a system equipped with plural arithmetic processing units in one housing. The system may also be a system configured by interconnecting plural computers as arithmetic processing units through communication.

(Parallel Program Generation Processing)

Figure 2:
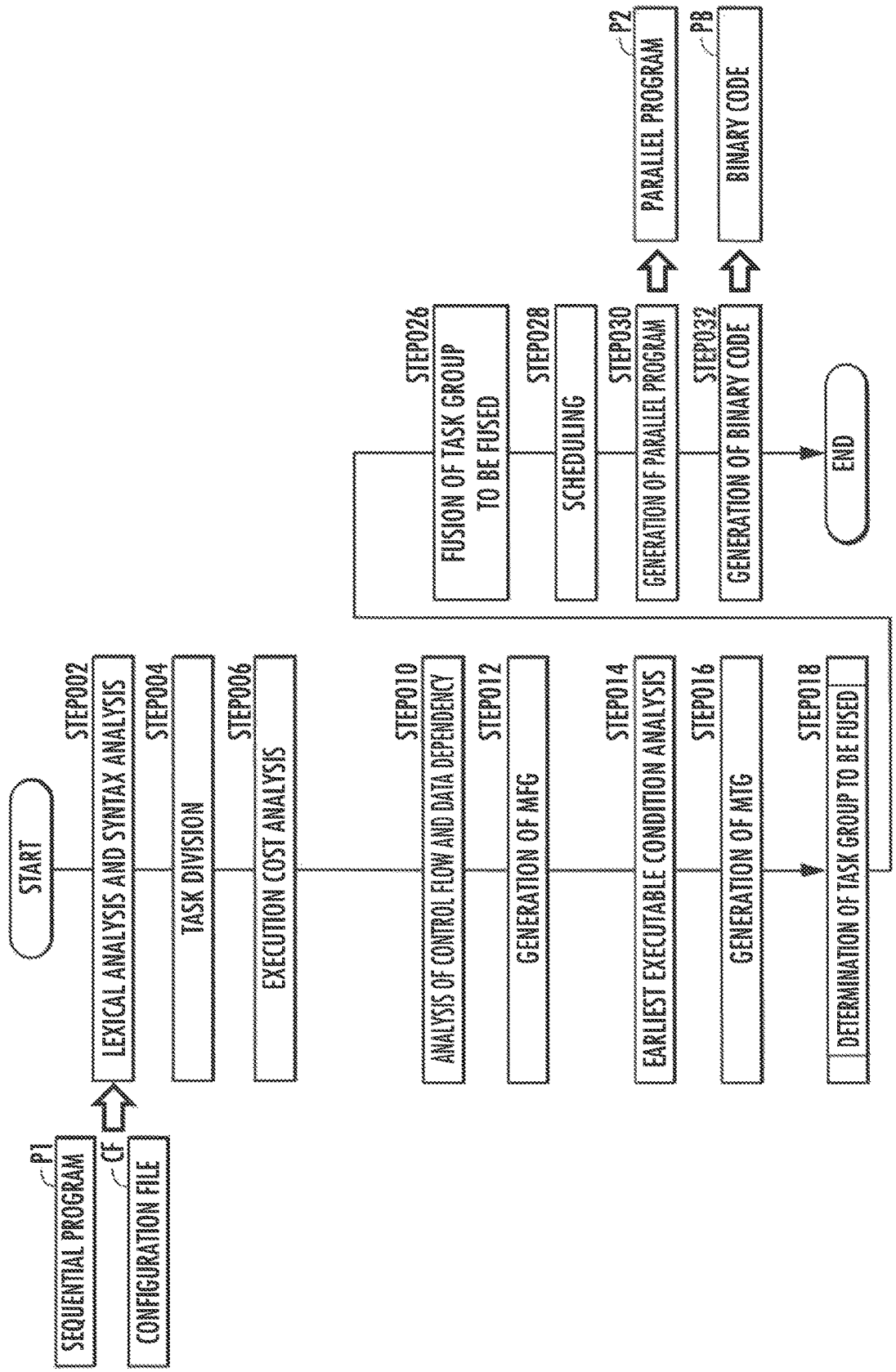
FIG. 2 is a flowchart of parallel program generation processing of one embodiment.
Figure 3:
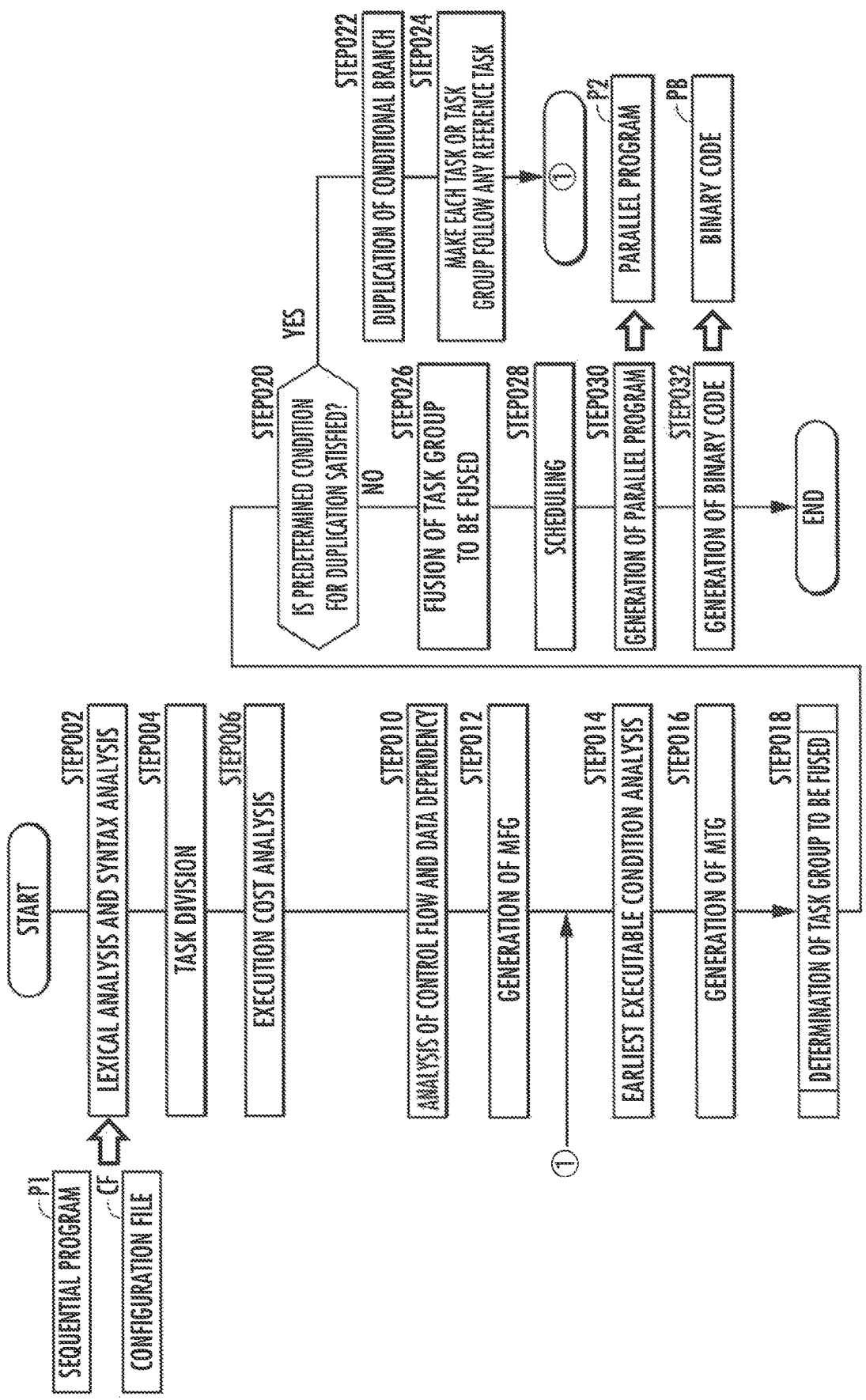
FIG. 3 is a flowchart of parallel program generation processing of another embodiment.

Referring next to a flowchart of FIG. 2, and further referring to FIG. 3 as another example, generation processing for a parallel program P2 and the binary code PB performed by the arithmetic processing element 110 of the parallelization compiling apparatus 100 executing the parallelization compiler C is described.

First, FIG. 2 is described.

When reading the sequential program P1 and the configuration file CF through the reading device 120, the arithmetic processing element 110 performs lexical analysis and syntax analysis on the sequential program P1 (FIG. 2/STEP002).

Based on the results of the lexical analysis and syntax analysis, the task division element 111 divides the sequential program P1 into three kinds of coarse grain tasks (macro tasks), i.e., a basic block (BB) including an assignment statement and a conditional branch, a repetition block (RB) including repeated execution, and a subroutine block (SB) including a function (FIG. 2/STEP004). Note that a pseudo assignment statement block (BPA) obtained by fusing one or more basic blocks (BBs) may be handled as one task. The processing in FIG. 2/STEP004 corresponds to an example of a "task division step" of the present invention.

The task division element 111 analyzes the execution cost including the execution time of each task (FIG. 2/STEP006).

Figure 4:
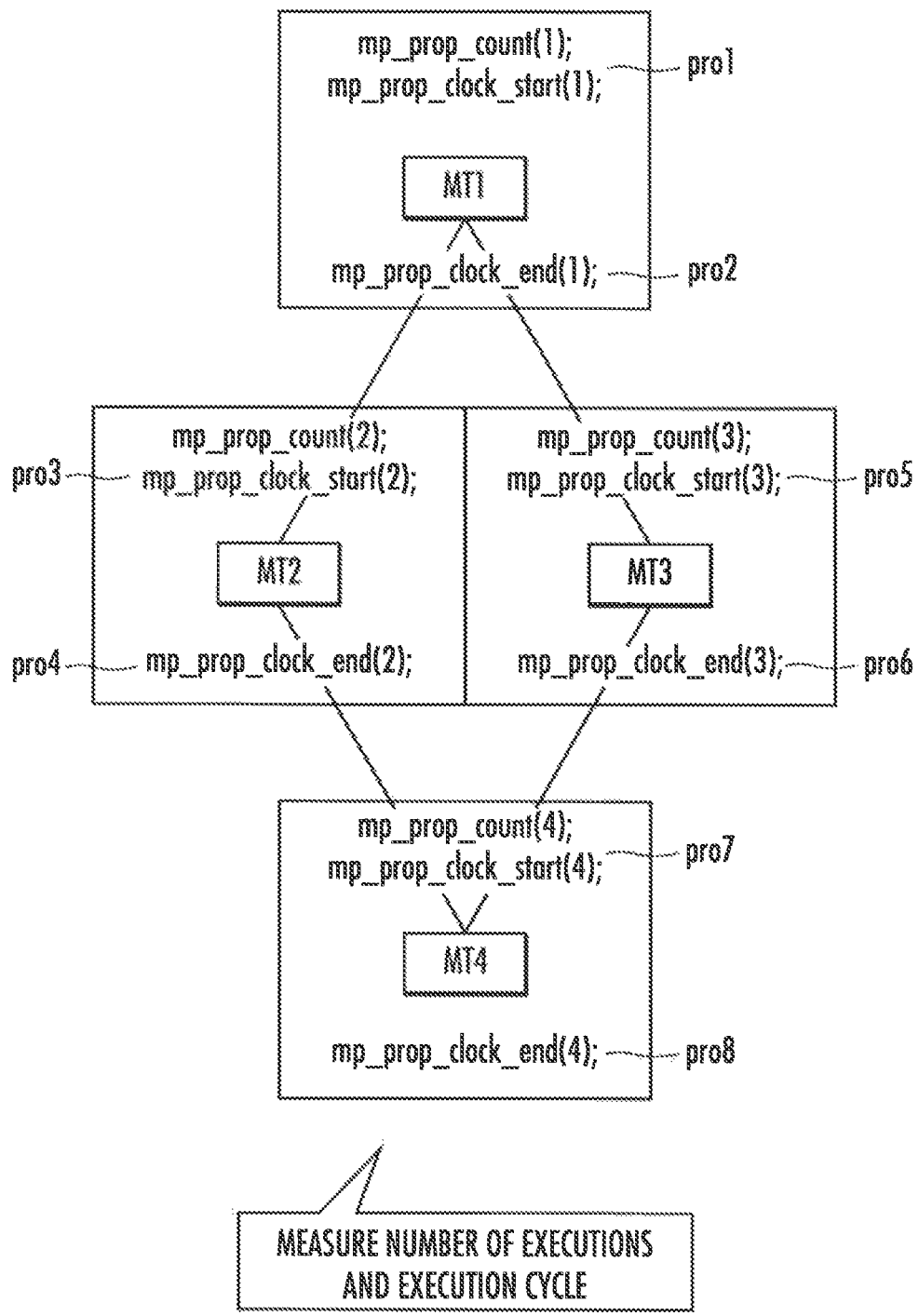
FIG. 4 is a diagram for describing the positions of inserting profilers.

For example, as illustrated in FIG. 4, the task division element 111 inserts profilers pro1 to pro8 before and after respective tasks to execute the program along a predetermined scenario in order to measure the number of executions and execution time(e) of each task as the execution cost. For example, it is considered the execution cost of a task MT1, where pro1 (mp_prop_count(1); mp_prop_clock_start(1)) is inserted before the MT1 and pro2 (mp_prop_clock_end(2)) is inserted after the MT1, and pro1 measures the number of times the processing passes through the MT1 and the start time of the processing of MT1 at that time, and pro2 measures the end time of the processing of MT1. The execution time of MT1 can be determined by subtracting the measurement value of the start time from the measurement value of the end time of MT1.

Further, pro3 (mp_prop_count(2); mp_prop_clock_start(2)) measures the processing start time of MT2 together with the number of processing times, pro4 (mp_prop_clock_end(2)) measures the processing end time of MT2, pro5 (mp_prop_count(3); mp_prop_clock_start(3)) measures the processing start time of MT3 together with the number of processing times, and pro6 (mp_prop_clock_end(3)) measures the processing end time of MT3. MT2 and MT3 are subsequent tasks branching from MT1, and the sum of the numbers of processing times of MT2 and MT3 coincides with the number of processing times of MT1. Further, the probability of branching from MT1 to MT2 can be calculated by dividing the number of processing times of MT2 by the number of processing times of MT1. The probability of branching to MT3 can be calculated in the same way. Further, like in the case of MT1, the execution times of MT2 and MT3 can be determined by subtracting the measurement value of each processing start time from the measurement value of each processing end time, respectively.

Thus, the execution times (execution costs) of all the other tasks can be measured in the same way.

If the execution time and probability of branching of a conditional branch in each branch direction can be measured, the execution costs of various task groups can be calculated based on the data. The calculation of the task execution costs is described in Reference Literature 2 (M. Miyazawa, M. Okamoto, and H. Kasahara, "Hierarchical Parallelism Control Scheme for Multigrain Parallelization," Trans. of IPSJ, 2003).

The execution cost may also include power consumption used to execute a task in addition to the number of executions and the execution time. The measured execution cost of each task can be used to calculate the execution cost of a task group (a group of plural tasks).

Figure 5:
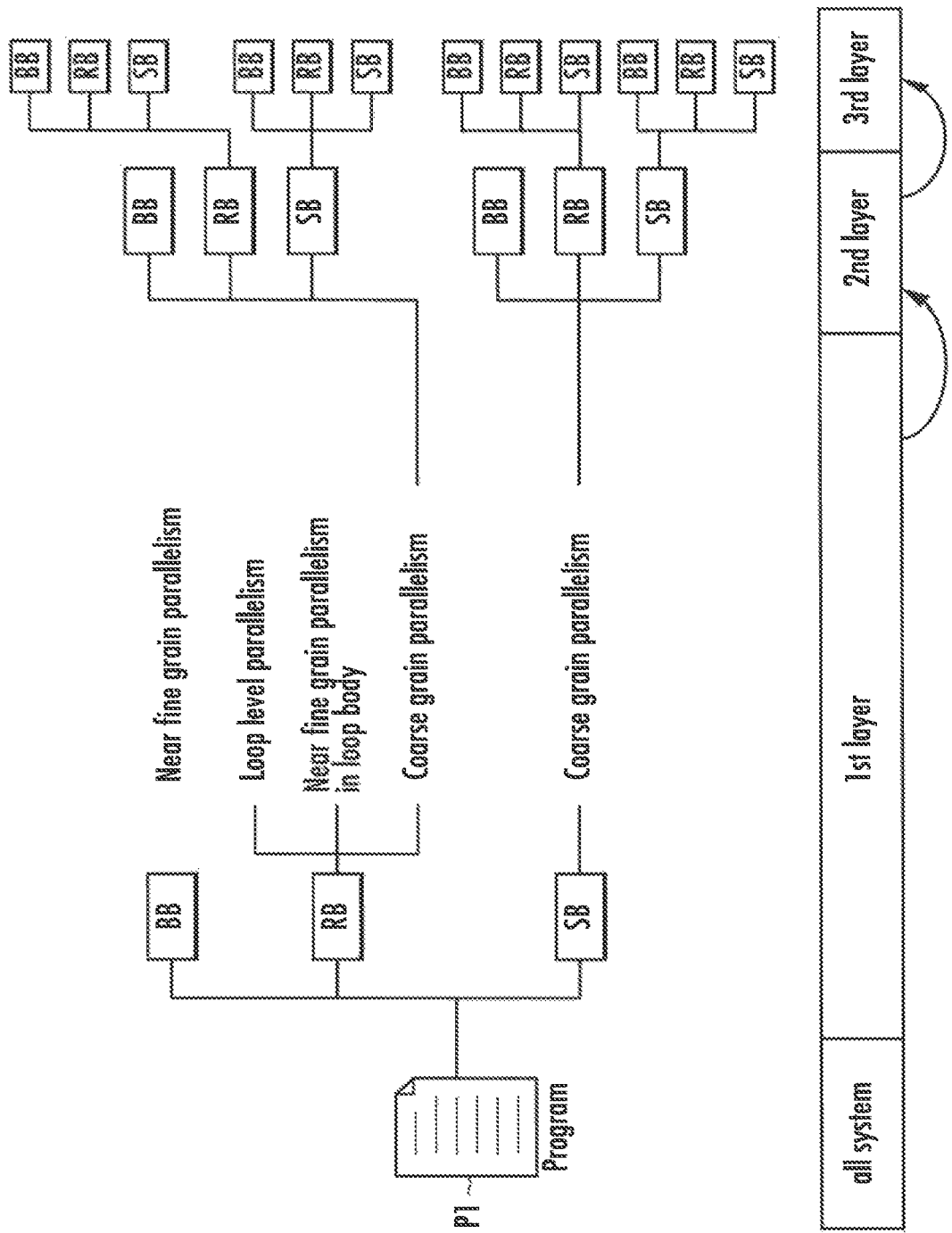
FIG. 5 is a descriptive diagram of multi-layered expansion of tasks.

After executing STEP006 for execution cost analysis, the task division element 111 performs inline expansion on a subroutine block SB as needed when the subroutine block SB includes a particularly large execution cost. This inline expansion is not illustrated in FIG. 2 (also in FIG. 3) because the inline expansion may be performed or may not be performed. As it is well known, the inline expansion means that a function call including a subroutine included in a program is replaced with program code in the subroutine block SB. FIG. 5 illustrates hierarchical parallelism potentially included in three kinds of (macro) tasks, i.e., the basic block BB, the repetition block RB, and the subroutine block SB, which constitute a program. For example, FIG. 5 illustrates that program code included in an SB belongs to a layer (the 2nd layer or the 3rd layer) below a layer (the 1st layer) calling the SB (performing a function call), which can be divided into BB, RB, and SB in the same way. This inline expansion is used when parallelism is more likely to be able to be extracted by expanding the program code in the subroutine block SB into an upper layer and performing analysis including thereof. However, when the inline expansion is used a lot, since the scale of the program code may become very large, the inline expansion is performed one layer by one layer from the upper layer. When the inline expansion is performed, the processing flow is returned again to STEP004 for task division. Further, a program after being subjected to inline expansion can be targeted for parallelization from the beginning of the parallelization processing flow.

After completion of the execution cost analysis, the dependency analysis element 112 analyzes the control flow and data dependency of each task divided in the task division processing (FIG. 2/STEP010), and generates a macro flow graph (hereinafter abbreviated as "MFG") (FIG. 2/STEP012).

Figure 6:
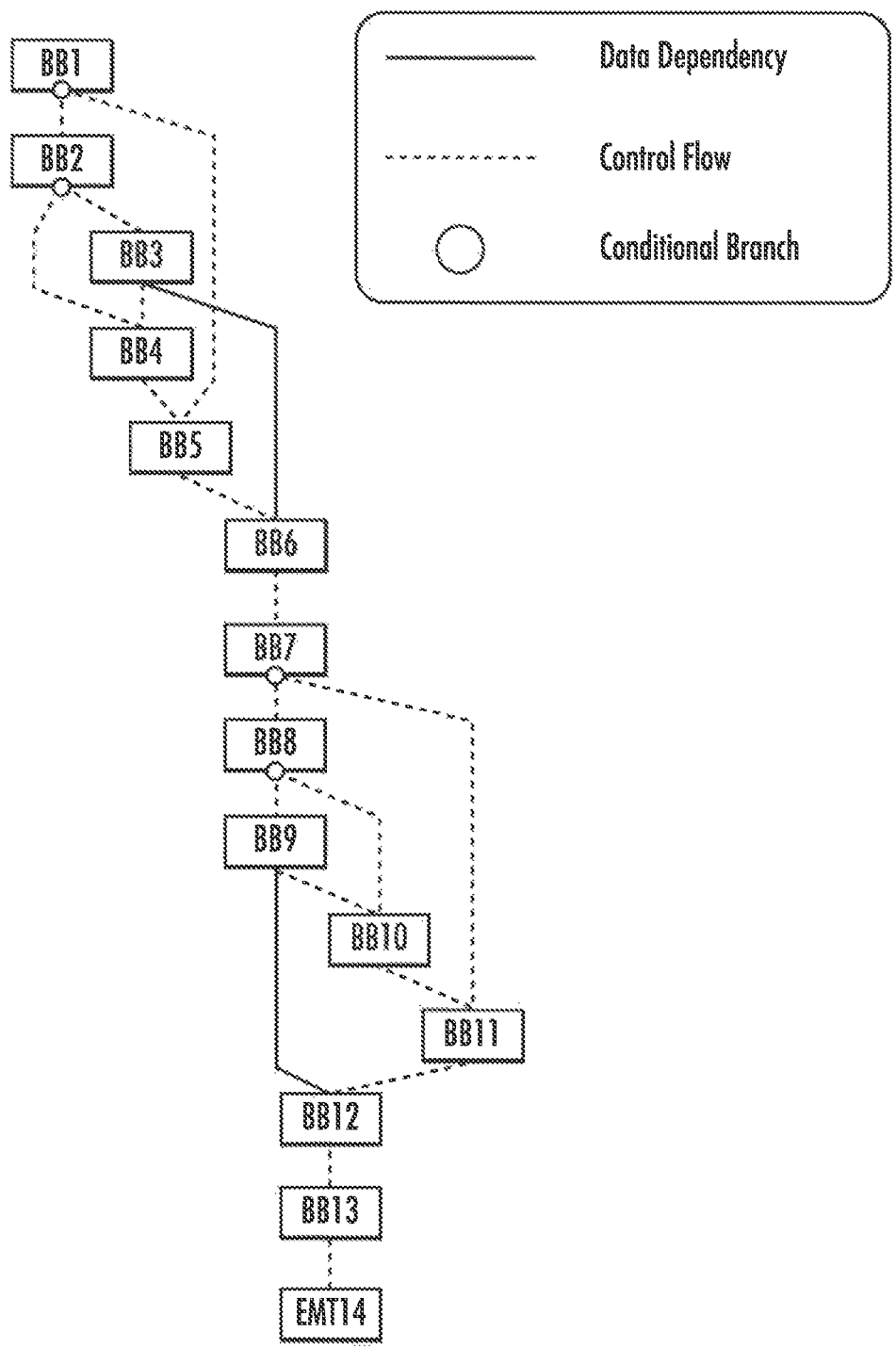
FIG. 6 is a diagram illustrating a first example of a macro flow graph (MFG).

An example of the MFG thus generated is illustrated in FIG. 6. As illustrated in FIG. 6, the MFG is composed of tasks as nodes, and solid-line edges and broken-line edges, each of which connects two nodes. Note that EMT14 in FIG. 6 is not a task, which is a symbol indicating the completion of a group of tasks.

Each task is any one of the basic block (BB) (or the pseudo assignment statement block (BPA)), the repetition block (RB), and the subroutine block (SB). Each solid-line edge indicates data dependency from a post-processing task (a task to be post-executed in the sequential program) to a pre-processing task (a task to be pre-executed in the sequential program). Each broken-line edge indicates a control flow from the pre-processing task to the subsequent processing task. Note that a small circle in each node indicates a conditional branch.

For example, in FIG. 6, basic block BB1, basic block BB2, and basic block BB5 are connected by broken-line edges, respectively. This means that the respective branch directions of the conditional branch included in the basic block BB1 are the basic block BB2 and the basic block BB5. In the following description, when the branch direction of the conditional branch included in the basic block BB1 in the MFG is BB2, the branch direction is denoted as "BB12," where the number 2 of the first task BB2 in the branch direction on the control flow is indicated by a subscript together with the name BB1 of the task BB1 that includes the conditional branch. Similarly, when the branch direction of the conditional branch included in the basic block BB1 is BB5, the branch direction is denoted as "BB15."

Further, in FIG. 6, basic block BB3 and basic block BB6 are connected by a solid-line edge, and this means that the basic block BB6 is data dependent on the basic block BB3.

Although the arrow of each edge in the MFG of FIG. 6 is omitted, the direction of each edge is set downward.

The dependency analysis element 112 analyzes the earliest executable conditions of tasks on the MFG (FIG. 2/STEP014). Note that processing in FIG. 2/STEP014 corresponds to an example of an "earliest executable condition analyzing step" included in a "dependency analysis step" of the present invention. The earliest executable conditions for tasks are analyzed by analyzing the control dependency and data dependency of each task based on the MFG However, since the virtual analysis on the earliest executable conditions can be easily given upon completion of analysis on the control dependency and data dependency of each task, both or either one is set as the dependency analysis in this specification.

First, description is made in such a case that the control dependency and data dependency are analyzed on the MFG in FIG. 6. Since it is determined whether the basic block BB2 is executed or not according to the execution result of the conditional branch of the basic block BB1 illustrated in FIG. 6, the basic block BB2 is control dependent on one branch direction BB12 of the conditional branch included in the basic block BB1.

Since it is also determined whether the basic block BB3 is executed or not according to the branch direction of a conditional branch included in the basic block BB2, the basic block BB3 is control dependent on one branch direction BB23 of the conditional branch included in the basic block BB2. In this case, the basic block BB3 is indirect control dependent on the one branch direction BB12 of the conditional branch included in the basic block BB1.

Further, since the basic block BB5 is executed regardless of which of the directions is the branch direction of the conditional branch of the basic block BB1, the basic block BB5 is not control dependent on all the branch directions BB12 and BB15 of the conditional branch included in the basic block BB1.

The basic block BB6 is data dependent on the basic block BB3. However, even when it is determined that the basic block BB2 is not executed (and hence the basic block BB3 is not executed) by determining the conditional branch of the basic block BB1 in one branch direction BB15, the basic block BB6 can be executed. Thus, BB6 is extended-control dependent on the one branch direction BB15 of the conditional branch included in the basic block BB1.

Further, since the basic block BB6 can be executed even when it is determined that the basic block BB3 is not executed by determining the conditional branch of the basic block BB2 in one branch direction BB24, the basic block BB6 is extended-control dependent on the one branch direction BB24 of the conditional branch of the basic block BB2.

The MFG represents the control flow and data dependency between tasks in the sequential program, but does not represent parallelism. In order to extract parallelism, the earliest executable conditions need to be analyzed based on the analysis results of the control dependency of each task and the data dependency between respective tasks described thus far. The earliest executable conditions for a task are conditions for making the task executable at the earliest time. Here, the following relationships between respective tasks are established (see Reference Literature 3 (D. Inaishi, K. Kimura, K. Fujimoto, W. Ogata, M. Okamoto, and H. Kasahara, "A Cache Optimization with Earliest Executable Condition Analysis," Proc. 58$^{th}$ National Convention of IPSJ, 1999)).

(1) When the i-th task MTi is control dependent on one branch direction of a conditional branch included in the j-th task MTj (j≠i), the i-th task MTi can be executed when the branch direction of conditional branch of the j-th task MTj is determined even when the execution of the j-th task MTj is not completed.

(2) When the i-th task MTi is data dependent on the k-th task MTk (k≠i), the i-th task MTi cannot be executed until completion of the execution of the k-th task MTk.

To organize this, it can be represented that the earliest executable conditions for the i-th task MTi are the following (3) and (4).

(3) The conditional branch of the j-th task MTj on which the i-th task MTi is control dependent branches to a path including the i-th task MTi.

(4) The k-th task MTk (k≠i) on which the i-th task MTi is data dependent is fully completed, or the non-execution of the k-th task MTk (k≠i) is determined.

For example, the earliest executable conditions for the basic block BB6 (corresponding to the "MTi") in the macro flow graph (MFG) of FIG. 6 can be represented by the following (5) and (6).

(5) The execution of the basic block BB1 (corresponding to the "MTj") is determined (because the execution of the basic block BB6 is determined regardless of which of the directions is the branch direction of the basic block BB1).

(6) The basic block BB3 (corresponding to the "MTk") on which the basic block BB6 is data dependent is completed, or the basic block BB3 on which the basic block BB6 is data dependent is determined not to be executed.

Here, in terms of the MFG of FIG. 6, "the basic block BB3 on which the basic block BB6 is data dependent is determined not to be executed" means that "the branch direction of the conditional branch in the basic block BB2, on which the basic block BB3 is control dependent, is determined to be the branch direction BB24 to execute the basic block BB4," or "the branch direction of the conditional branch in the basic block BB1, on which the basic block BB3 is indirect control dependent, is determined to be the branch direction BB15 to execute the basic block BB5."

Then, the case where "the branch direction of the conditional branch in the basic block BB2, on which the basic block BB3 is control dependent, is determined to be the branch direction BB24 to execute the basic block BB4" includes the case where "the execution of the basic block BB1 is determined" because of the assumption that "the branch direction of the conditional branch of the basic block BB1 is determined to be the branch direction BB12 to execute the basic block BB2."

Further, the case where "the branch direction of the conditional branch in the basic block BB1, on which the basic block BB3 is indirect control dependent, is determined to be the branch direction BB15 to execute the basic block BB5" includes the case where "the execution of the basic block BB1 is determined."

Thus, the earliest executable conditions for the basic block BB6 illustrated in the MFG of FIG. 6 can be simplified as follows.

The basic block BB3 is completed, or the branch direction of the conditional branch of the basic block BB1 is determined to be the branch direction BB15 to execute the basic block BB5, or the branch direction of the conditional branch of the basic block BB2 is determined to be the branch direction BB24 to execute the basic block BB4. Note that the earliest executable conditions may not be necessarily simplified in this way.

As described above, when the same earliest executable condition analysis as that performed on the basic block BB6 is made on the other tasks, the earliest executable conditions for respective tasks are represented in a table illustrated in FIG. 7. In the table illustrated in FIG. 7, the left column indicates the names of respective tasks, and the right column indicates tasks on which the respective tasks are data dependent, or branch directions on which the respective tasks are control dependent or extended-control dependent. For example, in the table illustrated in FIG. 7, it is indicated that BB2 is control dependent on the branch direction $BB1_2$ of the conditional branch of BB1. In the table illustrated in FIG. 7, it is also indicated that BB6 is data dependent on BB3, control dependent on the branch direction $BB1_5$ of the conditional branch of BB1, and extended-control dependent on the branch direction $BB2_4$ of the conditional branch of BB2. In the table illustrated in FIG. 7, "or" indicates that each task on the left column is executable if any of the conditions is satisfied. Though not indicated in the table illustrated in FIG. 7, "and" can be used to represent a case where a task is executable when two or more conditions are satisfied such as ($BB1_5$ and BB3).

Based on the results of the earliest executable condition analysis in FIG. 2/STEP014, the dependency analysis element 112 generates a macro task graph (hereinafter abbreviated as "MTG") in which parallelism between tasks is extracted (FIG. 2/STEP016).

Figure 8:
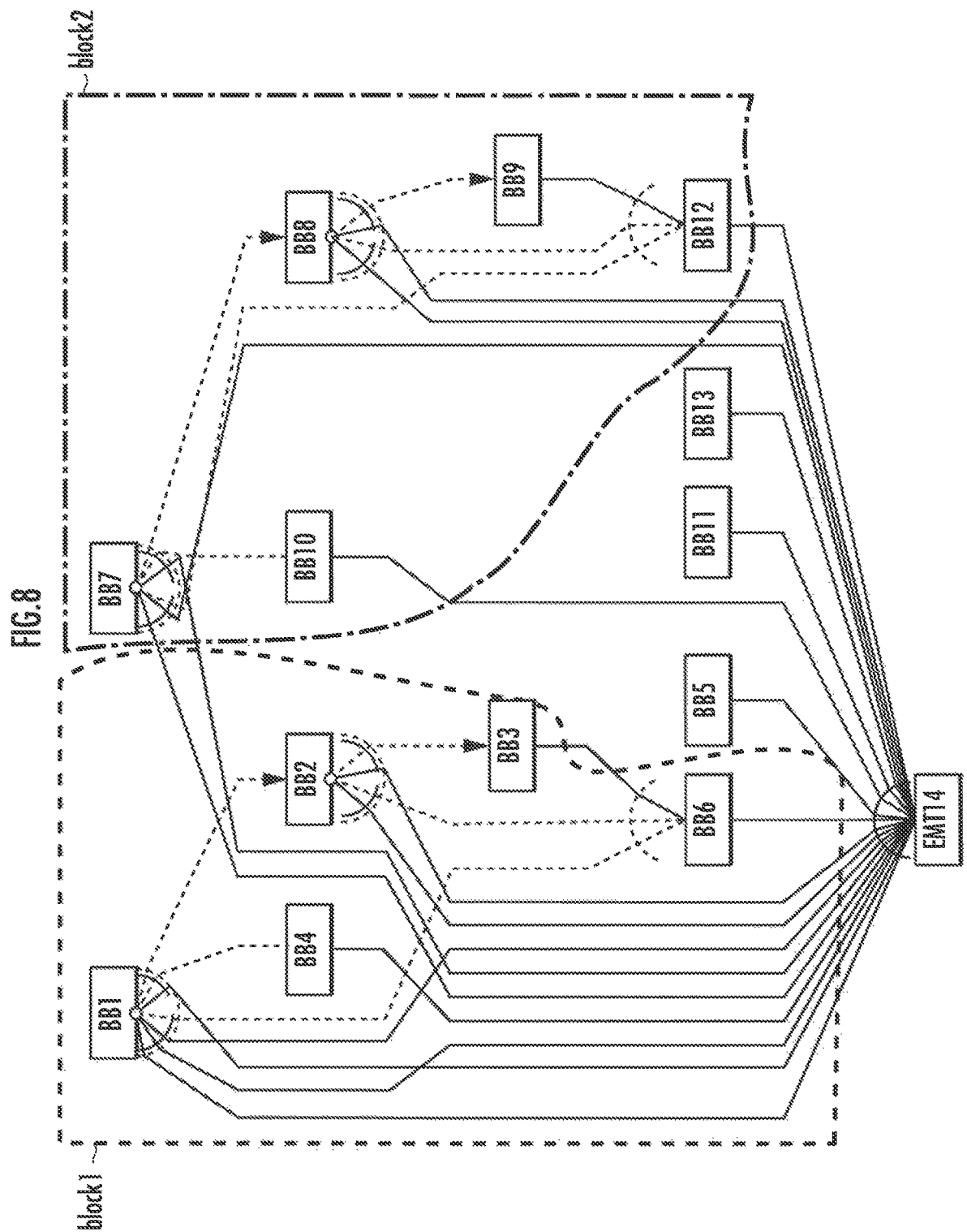
FIG. 8 is a diagram illustrating a first example of a macro task graph (MTG) generated from the MFG of FIG. 6.

For example, the arithmetic processing element 110 generates an MTG illustrated in FIG. 8 based on the results of performing the earliest executable condition analysis in FIG. 2/STEP014 on each task in the MFG of FIG. 6 as already described.

Like in the MFG; each node in the MTG indicates each task, a small circle in each node indicates a conditional branch in each task, each solid-line edge indicates data dependency, and each broken-line edge indicates control dependency or extended-control dependency. Further, as described in FIG. 6, EMT14 in the MTG of FIG. 8 is not a task, which is a symbol indicating the completion of a group of tasks.

Further, there are two kinds of arcs that bundle respective edges. The solid-line arc indicates that respective edges bundled with the arc are in an AND relationship, i.e., that tasks respectively subsequent to two or more broken-line edges bundled with the solid-line arc are executable simultaneously in parallel with each other, and the broken-line arc indicates that respective edges bundled with the arc are in an OR relationship, i.e., that tasks respectively subsequent to two or more broken-line edges bundled with the broken-line arc are in a selective relationship at respective conditional branches.

For example, in the MTG illustrated in FIG. 8, since the basic block BB6 is data dependent on the basic block BB3, the basic block BB6 is connected with the basic block BB3 through a solid-line edge indicative of data dependency.

For example, as can be seen from the MFG of FIG. 6, since the basic block BB6 is extended-control dependent on one branch direction $BB1_5$ of the conditional branch included in the basic block BB1 and one branch direction $BB2_4$ of the conditional branch included in the basic block BB2, the basic block BB6 is connected in a branch direction different from the branch directions of the conditional branch included in the basic block BB1 toward BB2 and BB4 through the broken-line edges indicative of control dependency or extended-control dependency, and in a branch direction different from the branch direction of the conditional branch included in the basic block BB2 toward BB3, respectively.

The basic block BB12 in the MTG of FIG. 8 can also be described in the same way as the basic block BB6. In other words, BB12 is first data dependent on the basic block BB9.

Then, as can be seen from the MFG of FIG. 6, since BB12 is extended-control dependent on one branch direction $BB7_{11}$ of the conditional branch included in the basic block BB7 and one branch direction $BB8_{10}$ of the conditional branch included in the basic block BB8, BB12 is connected in a branch direction different from the branch directions of the conditional branch included in the basic block BB7 toward BB8 and BB10 through the broken-line edges indicative of control dependency or extended-control dependency, and in a branch direction different from the branch direction of the conditional branch included in the basic block BB8 toward BB9, respectively.

As described above, since these edges are in the OR relationship, the edges are bundled with a broken-line arc. Note that the direction of each edge whose arrow is omitted in the MTG is set downward. Further, edges with arrows represent the original control flow.

Further, for example, as can be seen from the MFG of FIG. 6, since the basic block BB5 is determined to be executed even when the conditional branches of preceding tasks such as the basic block BB1 branch to any direction, the basic block BB5 is not control dependent on the respective branch directions BB$1_2$, BB$1_5$ of the conditional branches included in the preceding tasks such as the basic block BB1. Further, the basic block BB5 is not data dependent and extended-control dependent on the preceding tasks. Therefore, as in the table of FIG. 7, the basic block BB5 is left blank in the column of earliest executable conditions, and the basic block BB5 in the MTG of FIG. 8 has no edges from other preceding tasks. In other words, it is indicated that BB5 is executable in parallel with other tasks or task groups. Similarly, on the MFG of FIG. 6, since the basic blocks BB11 and BB13 to be executed after the reference task BB7 are not control dependent or extended-control dependent on any of the branch directions of the conditional branch included in BB7, BB11 and BB13 are left blank in the column of earliest executable conditions in the table of FIG. 7, and the basic blocks BB11 and BB13 have no edges from preceding tasks in the MTG of FIG. 8.

Figure 9:
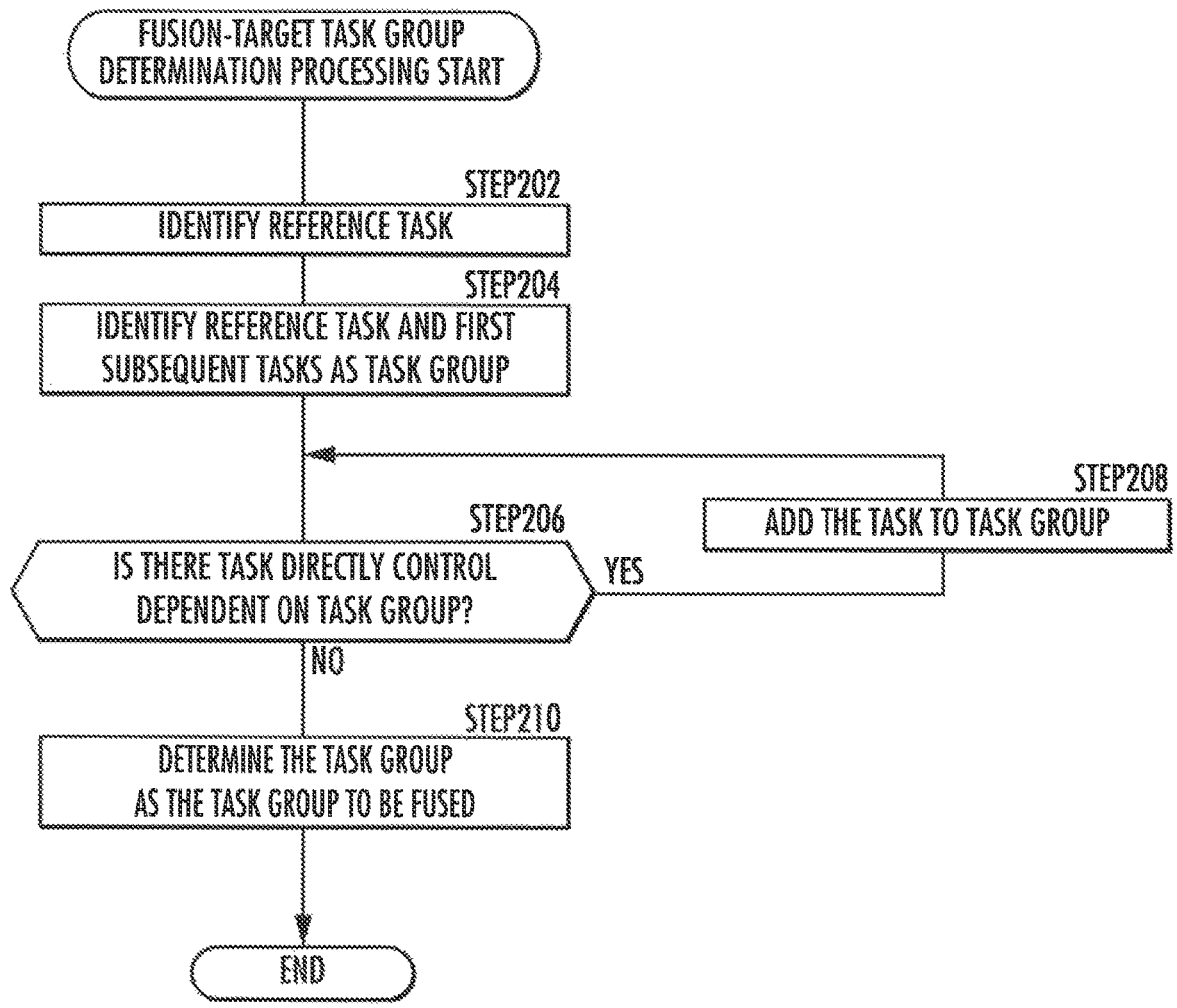
FIG. 9 is a flowchart that develops fusion-target task group determination processing in detail in STEP018 of FIG. 2 and FIG. 3.

Then, the fusion-target task group determination element 116 performs fusion-target task group determination processing for determining a task group as a fusion target from the MTG (FIG. 2/STEP018). A flowchart in which the details of FIG. 2/STEP018 is developed is illustrated in FIG. 9. Using FIG. 9, the contents of processing in FIG. 2/STEP018 are described in detail. Further, to give this description specifically, all tasks respectively subsequent to all branch directions of the conditional branch included in the basic block BB7 in the MTG of FIG. 8 are integrated to prepare an MTG illustrated in FIG. 10. It is understood that the description based on the MTG of FIG. 10 can also be applied to tasks respectively subsequent to all branch directions of the conditional branch included in the basic block BB1 in the MTG of FIG. 8.

Figure 10:
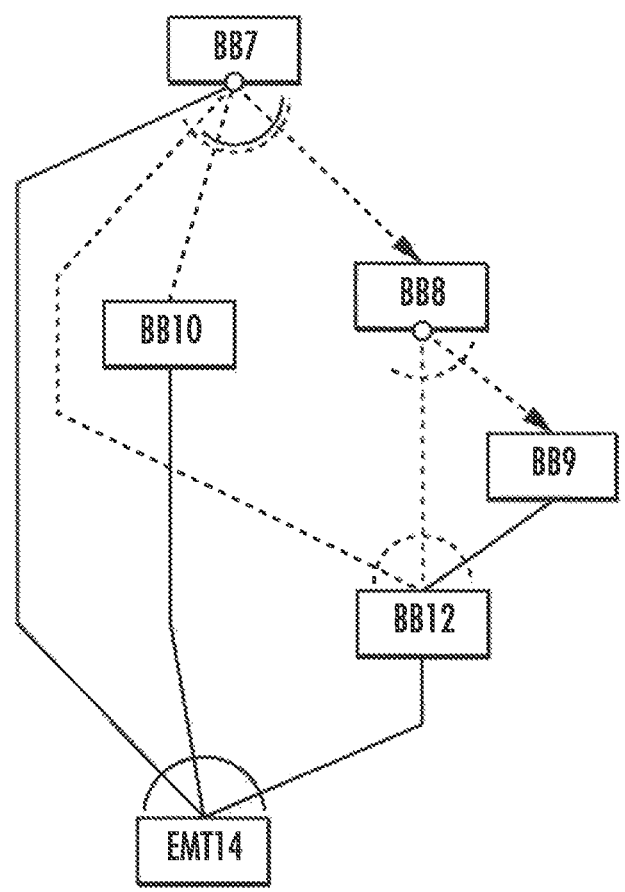
FIG. 10 is a diagram in which part of the MTG of FIG. 8 is extracted to describe the flowchart of FIG. 9.

Referring to FIG. 9 and FIG. 10, the fusion-target task group determination processing is described in more detail.

The fusion-target task group determination element 116 refers to the MTG to identify, as a reference task, a task which is not data dependent on the other tasks, is not control dependent, extended-control dependent, and indirect control dependent on any of the branch directions of conditional branches included in the other tasks, and includes one conditional branch (FIG. 9/STEP202).

As an example of identifying, as a reference task, a task which is not data dependent on the other tasks, is not control dependent, extended-control dependent, and indirect control dependent on any of the conditional branches included in the other tasks, and includes one conditional branch, the arithmetic processing element 110 can perform processing to refer to the MTG illustrated in FIG. 10 in order to identify the basic block BB7 as the reference task.

Then, the fusion-target task group determination element 116 refers to the MTG to identify, as a task group, the reference task and first subsequent tasks as all tasks respectively control dependent or extended-control dependent on all branch directions of the conditional branch included in the reference task (FIG. 9/STEP204). Note that processing in FIG. 9/STEP204 corresponds to a "first identification step" of the present invention.

In the example of FIG. 10, the fusion-target task group determination element 116 refers to the MTG illustrated in FIG. 10 to identify, as the first subsequent tasks, the basic blocks BB8 and BB10, which are control dependent on branch directions bundled with the solid-line arc of the conditional branch of the basic block BB7 as the reference task, i.e., the AND-connected branch directions, and the basic block BB12 extended-control dependent on the other branch directions bundled with the broken-line arc of the basic block BB7 as the reference task. Note that the "branch directions bundled with the solid-line arc of the conditional branch of the basic block BB7, i.e., the AND-connected branch directions" are displayed by dividing the branch direction BB$7_8$ in FIG. 6 into two or more branch directions according to an MTG creation method. Further, "the other branch directions bundled with the broken-line arc of the basic block BB7" are displayed by dividing the branch direction BB$7_{11}$ in FIG. 6 into two or more branch directions according to the MTG creation method.

Then, the fusion-target task group determination element 116 identifies the reference task and the first subsequent tasks as a task group (FIG. 9/STEP204). FIG. 9/STEP204 corresponds to a "first identification step" in the present invention.

The fusion-target task group determination element 116 refers to the MTG to determine whether there is a task control dependent or extended-control dependent on any of the branch directions of the conditional branches of the tasks included in this identified task group (FIG. 9/STEP206).

The fusion-target task group determination element 116 refers to the MTG illustrated in FIG. 10 to identify that the basic block BB9 is control dependent on the branch direction toward BB9, which is from the conditional branch included in the basic block BB8 included in the above-described, identified task group. Therefore, the fusion-target task group determination element 116 determines, in STEP206 of FIG. 9, that there is a task control dependent or extended-control dependent on any of the branch directions of the conditional branches included in the tasks in the task group, i.e., determines YES, and sets this basic block BB9 as a second subsequent task. It should be noticed that the basic block BB9 as this second subsequent task is indirect control dependent on the branch direction of the conditional branch included in the reference task BB7 toward BB8. In other words, identifying the second subsequent task corresponds to identifying a task indirect control dependent on the branch direction of the conditional branch included in the reference task.

As described above, when the determination result in FIG. 9/STEP206 is YES, the fusion-target task group determination element 116 adds the second subsequent task (the basic block BB9 in the example of FIG. 10) to the task group (FIG. 9/STEP208). Note that processing in FIG. 9/STEP208 corresponds to an example of a "second identification step" of the present invention.

After FIG. 9/STEP208, the fusion-target task group determination element 116 executes FIG. 9/STEP206 again to determine the presence or absence of a task control dependent or extended-control dependent on any of the branch directions of the conditional branch included in the second subsequent task.

For example, the fusion-target task group determination element 116 refers to the MTG illustrated in FIG. 10 to determine that there is no task control dependent or extended-control dependent on each of all the branch directions of the conditional branches included in the task group after the basic block BB9 is added.

When the determination result in FIG. 9/STEP206 is negative (NO in FIG. 9/STEP206), the fusion-target task group determination element 116 determines the task group to be a task group to be fused (FIG. 9/STEP210). Thus, a series of processing for repeating STEP206 and STEP208 in FIG. 9 corresponds to an example of a "control step" of the present invention.

The above description is made on the "fusion-target task group determination" processing in FIG. 2/STEP018 using the more detailed flowchart in FIG. 9 by taking, as an example, the MTG of FIG. 10 in which the basic block BB7 and tasks respectively subsequent to all branch directions thereof are cut out from the MTG of FIG. 8. It will be understood that this description can also be applied to the basic block BB1 and all tasks respectively subsequent to all branch directions of the conditional branch included in the basic block BB1 in the MTG of FIG. 8. For example, the description based on FIG. 10, in which the basic block BB7 and all tasks respectively subsequent to all the conditional branches included therein are cut out, also holds true for the basic block BB1 and all subsequent tasks by replacing the basic blocks BB7, BB10, BB8, BB9, and the basic block BB12 in FIG. 10 with the basic blocks BB1, BB4, BB2, BB3, and the basic block BB6 in FIG. 8, respectively. In other words, it can be confirmed that there are two task groups to be fused in the MTG of FIG. 8.

Further, for example, instead of the processing STEP202 to STEP210 in FIG. 9, the fusion-target task group determination element 116 may determine tasks including conditional branches on which all tasks are control dependent, extended-control dependent, or indirect control dependent to determine, based on the determination results, a task group to be fused. Further, the task group may also be identified to include tasks data dependent on the task group in consideration of the execution costs of the tasks.

Next, the fusion element 113 fuses the task group extracted in FIG. 2/STEP018 as one new task as the "task group to be fused" (FIG. 2/STEP026).

For example, the fusion element 113 refers to the MTG in FIG. 10 or FIG. 8 to fuse the "task group to be fused" including the basic blocks BB1 to BB4 and the basic block BB6 in FIG. 8 in order to generate a new task block1. The fusion element 113 fuses the "task group to be fused" including the basic blocks BB7 to BB10 and the basic block BB12 to generate a new task block2. As a result, an MTG including these new task block1 and task block2, and the basic blocks BB5, BB11, and BB13 as illustrated in FIG. 8 is generated. This MTG is illustrated in FIG. 14A.

Figure 14A:
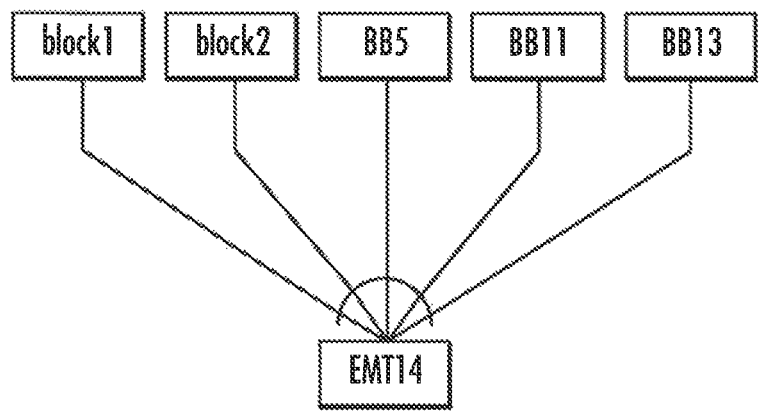
FIGS. 14A-14C are diagrams of fused MTGs generated from the MTG of FIG. 8, where

As can be seen from the MTG in FIG. 14A, five parallelly executable tasks including the new task block1 and block2 generated by the fusion can be extracted.

Next, the scheduling element 114 performs static scheduling processing to conform to the above-described configuration file CF (including information on the kinds and number of PEs, the grouping situation, the memory situation, and the like) together with the MTG generated via FIG. 2/STEP026. Note that the processing in FIG. 2/STEP028 corresponds to an example of a "scheduling step" of the present invention.

For example, when the number of PEs in the multiprocessor system is five in the configuration file CF, the scheduling element 114 can assign five tasks to the respective PEs. Further, if the number of PEs indicated in the configuration file CF is two, the arithmetic processing element 110 makes an assignment based on the execution costs of the five tasks to minimize the execution cost difference between the two PEs. For example, the scheduling element 114 can assign the block1 and BB5 to PE1 as a first PE, and the block2, BB11, and BB13 to PE2 as a second PE.

In the example described above, the number of parallelly executable tasks is not large, which is three to five. However, when the number of PEs that constitute the multiprocessor system increases as the number of parallelly executable tasks increases, the scheduling processing is not so simple based on the number of PEs as mentioned above. In this case, there is a need to consider various conditions, and hence the processing is generally complicated.

Here, as the scheduling method, the method disclosed in Patent Literature 1 using static scheduling to assign each task to any processing element PE or processing group PG depending on the task hierarchy can be adopted.

Further, in the multiprocessor system, especially in a multiprocessor system formed on a semiconductor chip, a mechanism using software to make the operating voltage of each processing element or the like in the system variable is often provided. This is to optimize the operating voltage in the multiprocessor system according to the execution situation of each individual task in order to reduce the power consumption. The arithmetic processing element 110 may use the estimated power consumption as an execution cost to select the operating voltage of each of the processing elements and the like that constitute a multiprocessor system appropriate for the execution of each task based on this execution cost, and insert an instruction to operate the processing element PE or the processing group PG at the operating voltage. Note that the details of the selection of appropriate operating voltage are described in Japanese Patent No. 4082706.

Further, the scheduling element 114 may perform cache optimization by trying global cache optimization between groups having dependency. Note that the global optimization is described in Japanese Patent No. 4177681.

Here, the voltage control and cache optimization, and the like can be realized relatively easily by using a runtime library or the like according to an automatic parallelizing API standard interpretation system and the platform of the multiprocessor system 200 disclosed in Patent Literature 1.

Based on the scheduling results, the generation element 115 generates a parallel program P2 (FIG. 2/STEP028).

Based on the information described in the configuration file CF, the generation element 115 uses a back-end compiler that supports various PEs in the multiprocessor system to generate binary code PB from the parallel program (source code) P2 (FIG. 2/STEP032). This processing STEP032 may be executed in the multiprocessor system 200. Note that processing in FIG. 2/STEP030 or FIG. 2/STEP032 corresponds to an example of a "generation step" of the present invention.

According to the processing mentioned above, the parallel program P2 (and the binary code PB) parallelly executable by the multiprocessor system 200 is generated. Then, the arithmetic processing element 110 ends the series of parallelization processing in the flowchart of FIG. 2.

As described above, although it becomes apparent that the technique of the present invention can extract more parallelly executable tasks than those in the conventional technique, further more parallelly executable tasks can be extracted depending on the state of the original sequential program and the configuration of the multiprocessor system. The following describes another example.

This example is to analyze whether there is a possibility that any further parallelly executable task exists in the "task group to be fused," which is generated in STEP018 of FIG. 2, and to insert, immediately after FIG. 2/STEP018, a step of determining how to handle the task group to be fused in both cases where such a task exists and where such a task does not exist. A flowchart thus created is illustrated in FIG. 3. STEP002 to STEP018 and STEP026 to STEP032 in FIG. 3 are the same as those in FIG. 2.

In STEP020 to STEP024 of FIG. 3, the arithmetic processing element 110 determines whether there are tasks having neither data dependency nor control dependency between two or more tasks, which are control dependent, extended-control dependent, and further indirect control dependent on one branch direction of the reference task included in the "task group to be fused," and when such tasks do not exist, fusion processing is performed intact on the task group, while when such tasks exist, these two or more tasks are handled as being parallelly executable.

An example of a processing flow in such a case as illustrated in FIG. 3 is described below by taking, as an example, the MTG of FIG. 8 like in the processing flow of FIG. 2. In this case, to make the description more understandable, a "task group to be fused" in which the basic block BB7 extracted from the MTG of FIG. 8 like in FIG. 10 is put in the forefront while changing some representations but without changing the configuration is reused in FIG. 11A again to give the description with reference to FIG. 11A as below.

After completion of the "fusion-target task group determination" processing in FIG. 3/STEP018, the condition determination element 117 proceeds to the subsequent determination processing to determine "predetermined condition satisfaction for duplication" in FIG. 3/STEP020 as an example of a "condition determination step" of the present invention.

When parallelly executable tasks or task groups do not exist in the above-described reference task and a task group in which subsequent tasks, such as the first subsequent tasks and the second subsequent tasks are added to the reference task, i.e., in a subsequent task group included in the "task group to be fused" as described thus far, the above-described task group including the reference task, the first subsequent tasks, and the second subsequent tasks is fused as one task so that the tasks having conditional branches can be hidden in one fused task. In other words, since the results in this case are the same as those of the processing flow in FIG. 2 so far, the following mainly describes the case where parallelly executable tasks or task groups exist.

When such tasks or task groups exist, the fusion element 113 duplicates the conditional branch included in the reference task by an increment obtained by subtracting one from the number of parallelly executable tasks or task groups. For example, when the number of parallelly executable tasks or task groups is three, the fusion element 113 duplicates the conditional branch included in the reference task by an increment corresponding to 3−1=2 to make three conditional branches including the conditional branch included in the reference task exist. Then, the parallelly executable tasks are made to follow respective of the conditional branch included in the reference task and the duplicated conditional branches to fuse the respective conditional branches and the tasks subsequent to the conditional branches so that the conditional branches and the parallelly executable tasks can be executed by (plural) processing elements PE corresponding in number to those in the multiprocessor system, respectively, and hence the degree of parallelism can be increased.

The details of duplication processing for conditional branches are described in Japanese Patent Application Laid-Open No. 2014-160453. However, in the present invention, more parallelly executable tasks can be extracted by combining this processing with the processing flow for generation of the parallel program in FIG. 2. This is described below.

In the following, the conditional branch included in the reference task may be called a "target conditional branch" as appropriate.

The condition determination element 117 determines whether predetermined conditions for duplication are satisfied to determine whether to fuse tasks after being duplicated or to fuse the tasks without being duplicated (FIG. 3/STEP020).

Figure 11B:
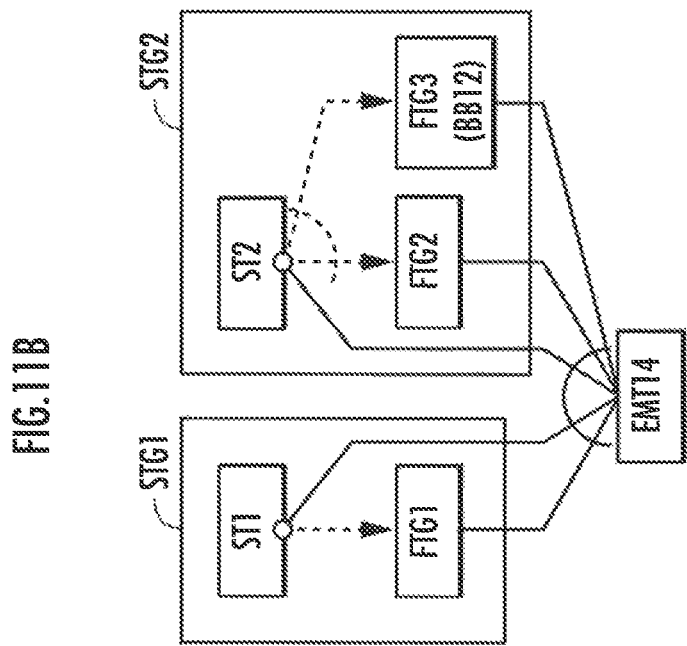
FIGS. 11A-11B are descriptive diagrams related to the duplication of a conditional branch included in a reference task based on the first example of the MTG of FIG. 8, where
Figure 11A:
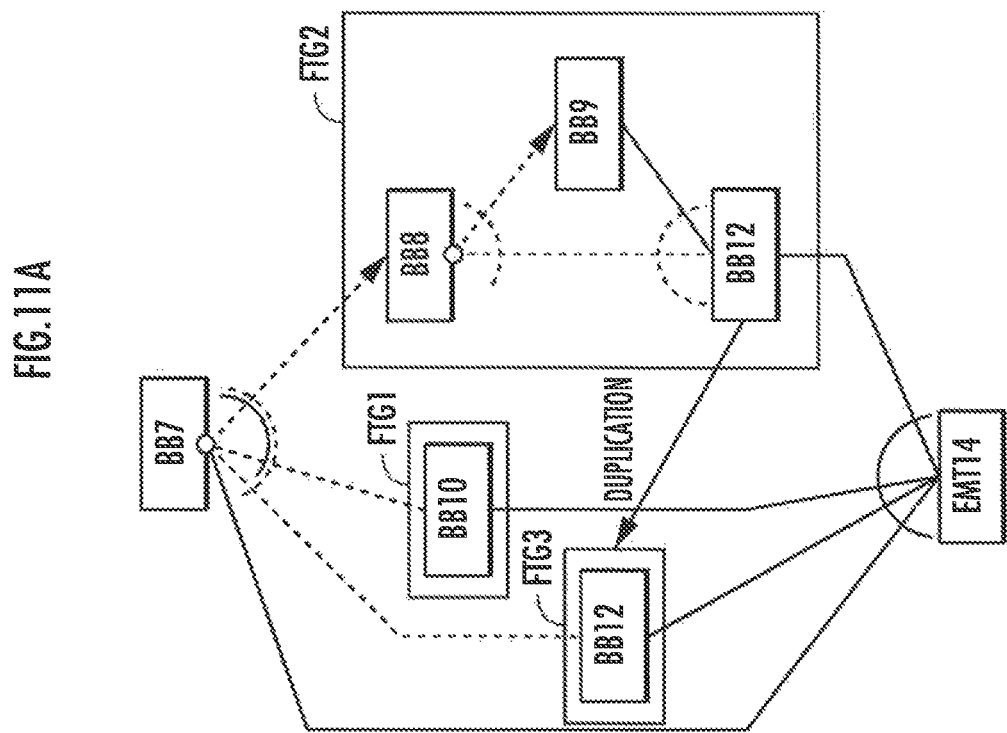

The predetermined conditions include at least such a parallelly executable condition that plural tasks or task groups control dependent, indirect control dependent, or extended-control dependent on one branch direction among plural branch directions of the target conditional branch do not have data dependency on one another. Thus, when the plural tasks or task groups control dependent, indirect control dependent, or extended-control dependent on the one branch direction do not have data dependency on one another, the one branch direction is called a "target branch direction" below. Note that the term "one branch direction" here is an expression used in a state before the earliest executable condition analysis is performed, for example, in a state of being expressed in the MFG of FIG. 6. However, it may also be expressed as two or more branch directions (in an AND relationship) indicated by the broken-line edges bundled with the solid-line arc in a state after the earliest executable condition analysis is performed, for example, in a state of being expressed in the MTG of FIG. 8. It is needless to say that it may be "one branch direction" even on the MTG Then, it is assumed that the "target branch direction" may indicate the "one branch direction" on the MFG or the two or more branch directions (in the AND relationship) indicated by the broken-line edges bundled with the solid-line arc on the MTG As illustrated in FIG. 11A, the basic blocks BB8 and BB10 are control dependent on the branch directions (bundled with the solid-line arc) in the AND relationship of the conditional branch of the basic block BB7. Further, the basic block BB9 is indirect control dependent on a branch direction of the conditional branch of the basic block BB7 toward the basic block BB8.

Further, the basic block BB12 is extended-control dependent on a different branch direction (bundled with the broken-line arc) in the OR relationship with the branch direction of the conditional branch included in the basic block BB7 toward the basic block BB8. The branch direction of the conditional branch of the basic block BB8 toward the basic block BB9 is extended-control dependent on the different branch direction in the OR relationship.

When the condition determination element 117 determines that the predetermined condition is satisfied in FIG. 3/STEP020 (YES in FIG. 3/STEP020), the fusion element 113 duplicates the reference task obtained by subtracting one from the number of parallelly executable tasks (FIG. 3/STEP022).

Here, the "duplication of a conditional branch" is described in more detail before specific description of the duplication of a conditional branch or a reference task.

A reference task including a conditional branch to be duplicated generally includes, in addition to the conditional branch, a set of statements on which the conditional branch is data dependent, i.e., a set of statements for setting conditions to determine the branch directions of the conditional branch. In the present invention, such a set of statements is called a "condition setting statement group." Further, a set of statements on which the conditional branch is not data dependent, i.e., a set of statements which can be potentially executed in parallel with the conditional branch may also be included. Similarly, such a set of statements is called a "statement group with the potentiality of parallel execution."

Then, when (only) the conditional branch is duplicated and assigned to a different PE together with subsequent tasks (groups) at the time of static scheduling, statements other than the conditional branch in the reference task (the above-described "condition setting statement group" and "statement group with the potentiality of parallel execution") are executed by one PE, and the execution results (data) are transferred to the PE that process the duplicated conditional branch and subsequent tasks. Therefore, in this case, the time required to transfer the execution results is added to the processing time of the parallel program.

Further, when the entire reference task is duplicated, since respective PEs perform processing for the condition setting statement group, data transfer between PEs is unnecessary, and hence the time for data transfer is not added to the processing time of the parallel program. However, since the duplicated reference tasks are executed by all PEs to which the duplicated reference tasks are assigned, this case has a slight disadvantage because power consumption is likely to increase. Further, when there is the statement group with the potentiality of parallel execution in the reference task, and there is no data dependency relationship between the conditional branch and the condition setting statement group, the statement group with the potentiality of parallel execution is executable in parallel with the conditional branch and the condition setting statement group. Therefore, if the statement group with the potentiality of parallel execution is assigned to a PE different from the PE that execute each duplicated reference task, the processing time of the parallel program can be reduced.

Thus, instead of duplicating only the conditional branch, only the conditional branch and the condition setting statement group are set as a new task and duplicated. In this case, since each PE configures the condition settings of the conditional branch in a minimum of time without the need for data transfer, the processing time of the parallel program can be reduced compared with the case where the reference task is duplicated.

In view of such circumstances, in addition to the simple duplication of only the conditional branch, the duplication of the "conditional branch and condition setting statement group", and the duplication of the conditional branch caused accordingly by the duplication of the reference task (including the case where there is no "statement group with the potentiality of parallel execution") correspond to examples of the "duplication of a conditional branch" in the present invention.

Here, the description is returned to the description of the "duplication of the conditional branch" in FIG. 3/STEP022 again.

For example, in the example illustrated in FIG. 11A, since the basic blocks BB8 and BB9, and the basic block BB10 have no data dependency on one another, the number of parallelly executable tasks subsequent to the target branch direction of the conditional branch included in the basic block BB7 is two.

The fusion element 113 duplicates the conditional branch included in the basic block BB7 as the reference task illustrated in FIG. 11A by an increment corresponding to "one" obtained by subtracting one from "two" as the number of parallelly executable tasks. Thus, as illustrated in FIG. 11B, the fusion element 113 generates reference task ST1 as the basic block BB7 and reference task ST2 including the duplicated conditional branch.

Then, the fusion element 113 makes each task or task group, which is control dependent, indirect control dependent, or extended-control dependent on the target branch direction of the target conditional branch, follow any one of the reference tasks (FIG. 3/STEP024). Among tasks or task groups control dependent, indirect control dependent, or extended-control dependent on the target branch direction of the target conditional branch, the fusion element 113 makes tasks or task groups having no data dependency on one another follow target branch directions of conditional branches included in respectively different reference tasks including the duplicated reference task.

For example, in FIG. 11A, the basic block BB8 and the basic block BB10 are control dependent on the target branch directions (branch directions surrounded by the solid-line arc in FIG. 11A) of the conditional branch included in the basic block BB7, and the basic blocks BB9 and BB12 are indirect control dependent. Thus, BB8, BB9, and BB12 constitute a subsequent task group FTG2, and BB10 which is neither data dependent nor control dependent on FTG2 constitutes a subsequent task group FTG1. Since FTG1 and FTG2 are parallelly executable, one duplication of the reference task BB7 is made and set as ST2, and the name of BB7 is changed to ST1. Then, FTG1 is made to follow a target branch direction of the conditional branch included in ST1, and FTG2 is made to follow a target branch direction of the conditional branch included in ST2. Further, in the MTG of FIG. 11A, the basic block BB12 is extended-control dependent on the other branch direction (the branch direction which is not surrounded by the solid-line arc) different from the target branch directions of the conditional branch included in the basic block BB7.

Thus, when there is one task (called a first task in this paragraph) control dependent, indirect control dependent, or extended-control dependent on both of two branch directions (these two branch directions are called a first branch direction and a second branch direction in this paragraph) of conditional branches, the arithmetic processing element 110 may duplicate the first task to generate a second task to make the first task follow the first branch direction of one conditional branch and the second task follow the second branch direction of the other conditional branch. Alternatively, the arithmetic processing element 110 may make the first task follow the first branch direction of one conditional branch and the second task follow the second branch direction of the one conditional branch. Specifically, in the above case, since the basic block BB12 is control dependent on both of the two branch directions, the arithmetic processing element 110 duplicates BB12 to generate one task identical to BB12 included in FTG2 to include the duplicated task in a task group FTG3 subsequent to the other branch direction. Then, the execution of STG1 and the execution of STG2 can be assigned to different processing elements in the multiprocessor system.

This case is described in some detail. As illustrated in FIG. 11B, since the subsequent task group FTG1 (composed of BB10 in this example) is control dependent on the target branch direction (the branch direction corresponding to the branch direction surrounded by the solid-line arc in FIG. 11A) of the conditional branch included in the reference task ST1 and there is no subsequent task in the other branch direction of ST1, the arithmetic processing element 110 integrates ST1 and FTG1 to form a "task group to be fused" STG1. Similarly, as illustrated in FIG. 11B, since the subsequent task group FTG2 (composed of the basic blocks BB8, BB9, and the basic block BB12) is control dependent on the target branch direction (the branch direction corresponding to the branch direction surrounded by the solid-line arc in FIG. 11A) of the conditional branch included in the reference task ST2, and the subsequent task group FTG3 (composed of BB12 in this example) is extended-control dependent on the other branch direction of ST2, the arithmetic processing element 110 integrates ST2, FTG2, and FTG3 to generate a "task group to be fused" STG2. The reason why BB12 is included in two subsequent task groups FTG2 and FTG3 is because, as illustrated in FIG. 11A, BB12 is indirect control dependent on the target branch direction of the conditional branch of the reference block BB7 (ST2 after the duplication), and extended-control dependent on the other branch direction, rather than the target branch direction, of the conditional branch of BB7.

Then, when the branch direction of the conditional branch included in the reference task ST1 in the STG1 is determined to be a branch direction to execute FTG1, the branch direction of the conditional branch included in the reference task ST2 in STG2 is also determined to be a branch direction to execute FTG2, while when the branch direction of the conditional branch included in the reference task ST1 is determined to be another branch direction different from the branch direction to execute FTG1, the branch direction of the conditional branch included in the reference task ST2 is also determined to another branch direction in the same manner to execute FTG3.

Although FTG3 is control dependent on a branch direction different from the target branch direction (the branch direction on which FTG2 is control dependent) of the conditional branch included in the reference task ST2, FTG3 can also be made to follow a branch direction different from the target branch direction (the branch direction on which FTG1 is control dependent) of the conditional branch included in the reference task ST1 of the task group STG1, and even this case does not run counter to the basic contents of the present invention.

Thus, two (parallelly executable) task groups STG1 and STG2 as illustrated in FIG. 11B can be newly extracted from the MTG (the "task group to be fused" including BB7 of FIG. 8 as a reference task) in FIG. 11A by executing STEP022 and STEP024 in FIG. 3.

Although the duplication of a conditional branch is described with reference to FIG. 11A and FIG. 11B by taking, as an example, the process of extracting the parallelly executable task groups STG1 and STG2 from the "task group to be fused" including BB7 extracted as the reference task from the MTG of FIG. 8, since the "task group to be fused" including BB1 of FIG. 8 as a reference task also has a similar configuration to the "task group to be fused" including BB7 as the reference task, two parallelly executable task groups (which are denoted as STG3 and STG4) can be newly extracted as "task groups to be fused" in the same manner as in FIG. 11A and FIG. 11B.

The fusion-target task group determination processing (FIG. 3/STEP018) when the predetermined condition is determined in FIG. 3/STEP020 to be satisfied (YES in FIG. 3/STEP020) is described in detail so far.

After this, the arithmetic processing element 110 returns to the processing in FIG. 3/STEP014 to analyze the presence or absence of further parallelly executable tasks based on the MTG including the newly extracted "task groups to be fused," and then passes through FIG. 3/STEP020 again. In this case, when parallelly executable tasks or task groups as the predetermined condition for task duplication do not exist, the arithmetic processing element 110 proceeds to fusion processing in FIG. 3/STEP026.

Figure 14B:
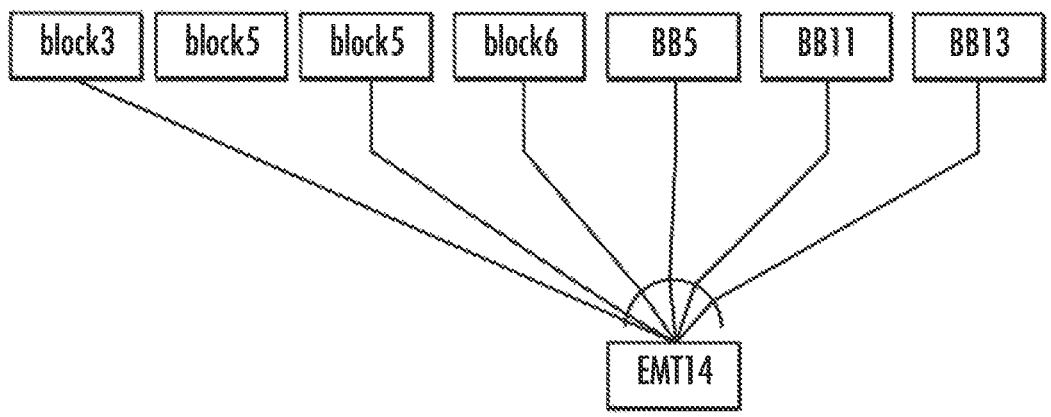

For example, as described based on FIG. 8, and FIG. 11A and FIG. 11B, since parallelly executable tasks do not further exist in the newly extracted "task groups to be fused" STG1, STG2, and STG3, STG4, these are subjected to fusion processing to newly generate four tasks. When these four tasks are denoted as block3, block4, and block5, block6, respectively, an MTG including these tasks newly generated is as illustrated in FIG. 14B, where the number of parallelly executable tasks is seven, which is two more than that in the case of simply fusing tasks in FIG. 14A, and four more than that in the conventional task fusion method of Patent Literature 1. Thus, the more the number of parallelly executable tasks, the more the freedom of scheduling increases.

Next, like in the processing flow of FIG. 2, after undergoing the scheduling processing in STEP028, the generation of a parallel program (source code) in STEP030, and then the generation of binary code in STEP032, the arithmetic processing element 110 ends all the processing steps. The processing after STEP028 is the same as the description in FIG. 2. Though detailed description is omitted, since the number of parallelly executable tasks is increased to seven when the present invention is applied to FIG. 8, the freedom of scheduling increases to enable the generation of an effective parallel program as described above.

Figure 12:
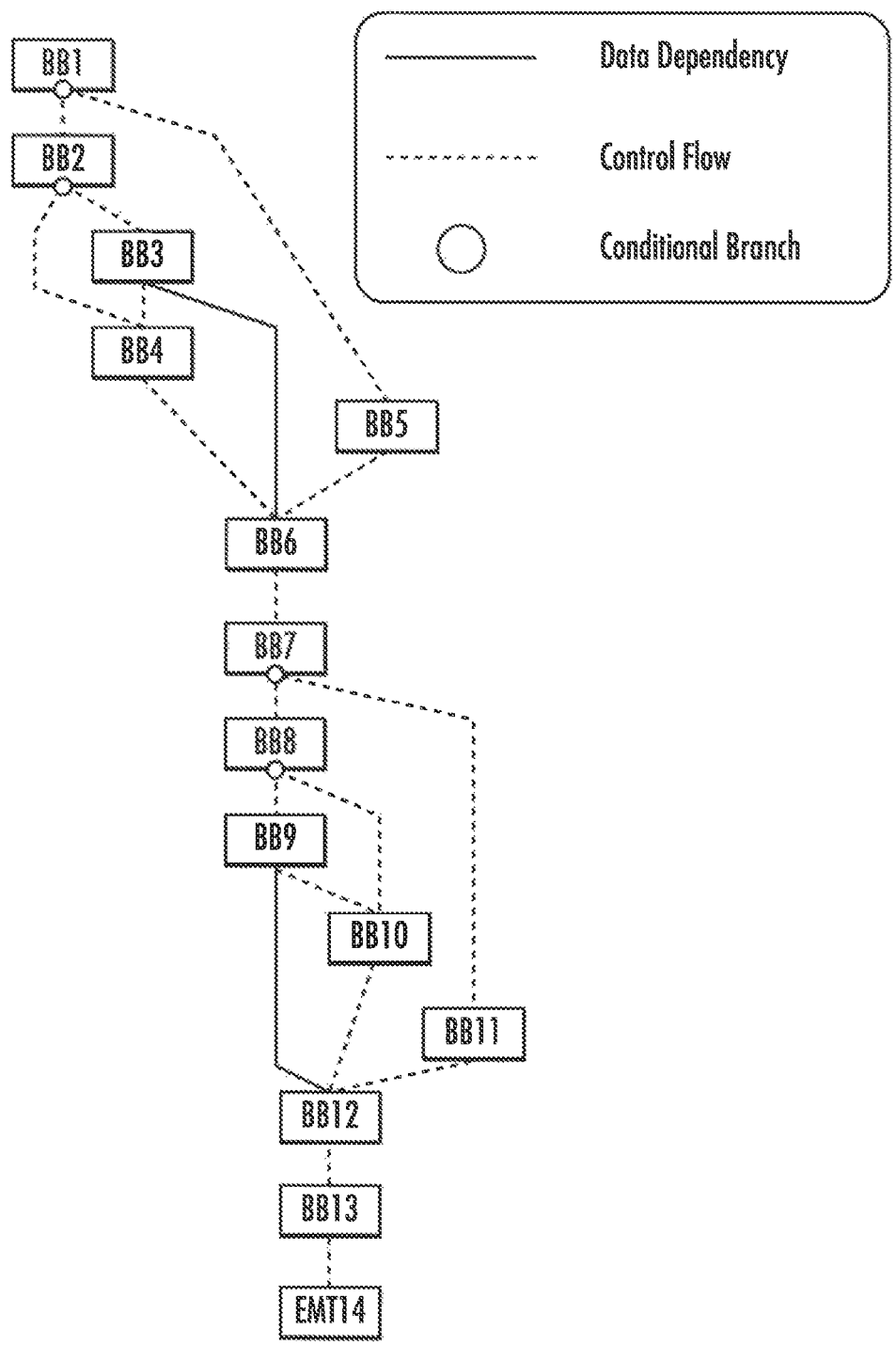
FIG. 12 is a diagram illustrating a second example of the MFG when the basic block BB5 is control dependent on the basic block BB1 and a basic block BB11 is control dependent on the basic block BB7.

While the present invention (the parallelization processing flows illustrated in FIG. 2 and FIG. 3) is described in detail so far by taking, as an example, the program illustrated in the MFG of FIG. 6, an example of an MFG different from the MFG of FIG. 6 is also described as illustrated in FIG. 12. The MFG of FIG. 12 is different from the MFG of FIG. 6 in that the broken line indicative of a control flow from the basic block BB4 is oriented toward the basic block BB6, rather than BB5, and a control flow from the basic block BB10 is oriented toward the basic block BB12, rather than the basic block BB11.

In this case, the basic block BB5 is control dependent on the branch direction $BB1_5$ of the conditional branch of the basic block BB1, and the basic block BB11 is control dependent on the branch direction $BB7_{11}$ of the conditional branch of the basic block BB7.

Like in the case of the MFG of FIG. 6, the dependency analysis element 112 analyzes both the control dependency of each task and the data dependency between the respective tasks to perform the earliest executable condition analysis using the results (STEP014 in FIG. 2 or FIG. 3). The results are illustrated in FIG. 13. In comparison between FIG. 13 and FIG. 7, it is found that $BB1_5$ is listed for BB5 and $BB7_{11}$ is listed for BB11 in the column of earliest executable conditions of the table of FIG. 13 while BB5 and BB11 are left blank in the column of earliest executable conditions of the table of FIG. 7, i.e., it is found that BB5 and BB11 have dependency relationships unlike those in FIG. 7.

Figure 15:
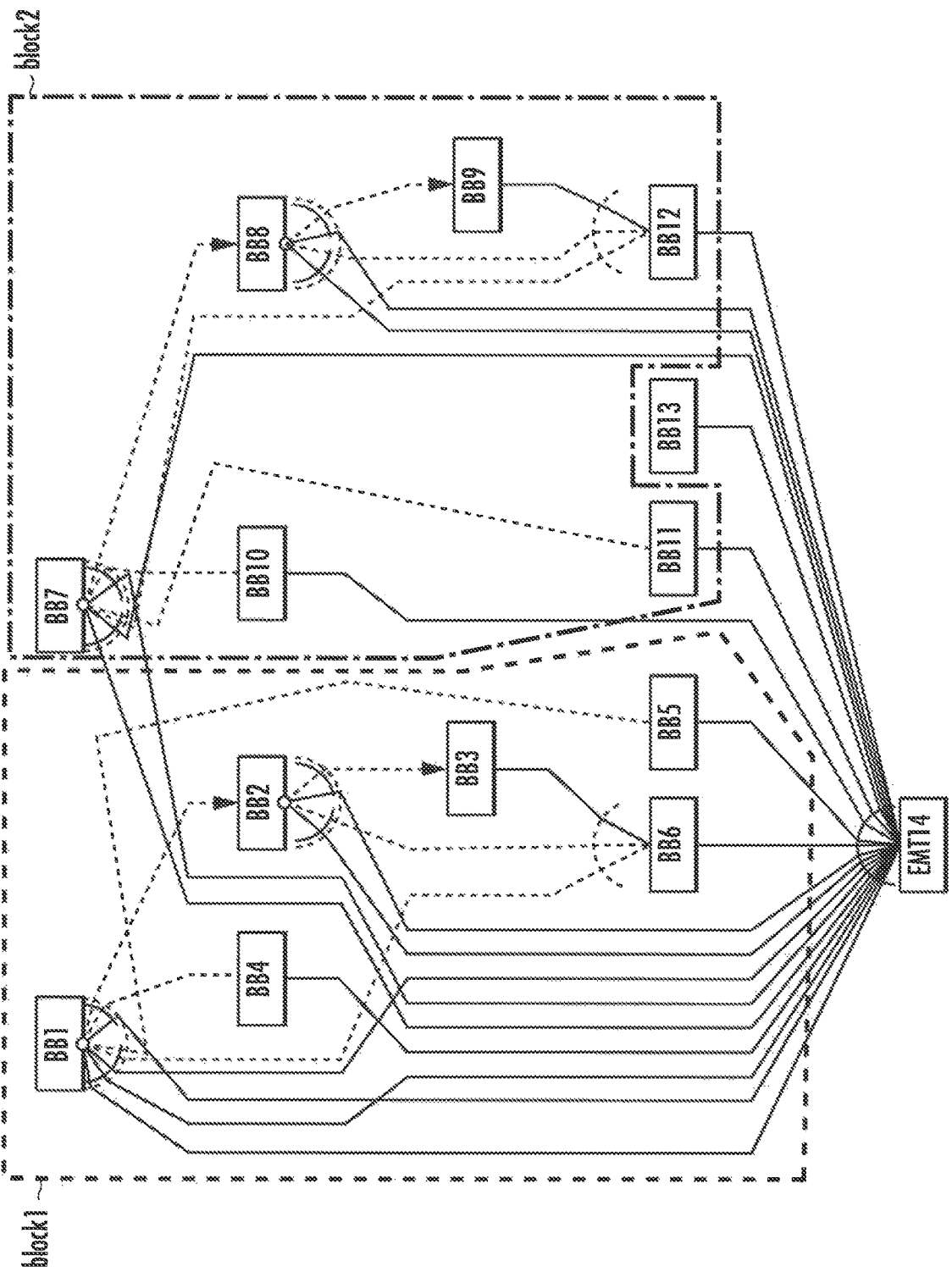
FIG. 15 is a diagram illustrating a second example of an MTG generated from the MFG of FIG. 12.
Figure 18A:
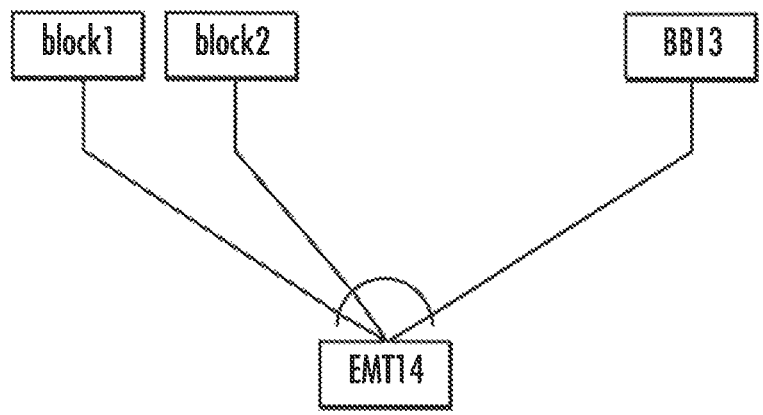
FIGS. 18A-18C are diagrams of fused MTGs generated from the MTG of FIG. 15, where

Using the results of the earliest executable condition analysis, the dependency analysis element 112 generates an MTG (STEP016 in FIG. 2 or FIG. 3). Specifically, an MTG generated from the MFG of FIG. 12 is illustrated in FIG. 15. From this MTG, it is found that BB5 and BB11 have no dependency relationship with any other task or task group in the MTG of FIG. 8 generated from the MFG of FIG. 6, while BB5 and BB11 have dependency relationships in the MTG of FIG. 15. Therefore, when the "fusion-target task group determination processing" (STEP018 in FIG. 2 or FIG. 3) is performed based on the MTG of FIG. 15, BB5 is included in the "task group to be fused" with BB1 included as the reference task, and BB11 is included in the "task group to be fused" with BB7 included as the reference task, unlike those in the case based on the MTG of FIG. 8. This is apparent from FIG. 16 in which the "task group to be fused" with BB7 as the reference task is extracted. Thus, in the fusion processing of FIG. 2/STEP026, the "task group to be fused" with BB1 as the reference task is fused into a new task block1, the "task group to be fused" with BB7 as the reference task is fused into a new task block2, and an MTG of FIG. 18A is generated together with BB13 having no dependency relationship with the two new tasks. As can be seen from this figure, since BB5 and BB11 are fused into block1 and block2, respectively, the number of parallelly executable tasks is three, which is smaller than that in FIG. 14A.

Here, STEP020 to STEP024 in FIG. 3 are applied to the "task groups to be fused" based on the MFG in FIG. 12 or the MTG in FIG. 15. For ease of explanation, the "task group to be fused" with BB7 as the reference task is extracted from the MTG of FIG. 15 and illustrated in FIG. 17A. In this figure, in addition to FIG. 11A, BB11 is added to follow a branch direction having an AND relationship with a branch direction to FTG3, in addition to FTG1 (composed of BB10) and FTG2 (composed of BB8, BB9, and BB12) subsequent to branch directions in an AND relationship with the conditional branch of the reference task BB7, and FTG3 (duplicated BB12) subsequent to a branch direction different from the branch directions. In this case, BB11 is referred to as a subsequent task group FTG4.

As can be seen from the above description, among the four tasks groups FTG1 to FTG4 subsequent to BB7, since FTG1 and FTG2 have no data dependency relationship, both are parallelly executable. Similarly, since FTG3 and FTG4 have no data dependency relationship, both are also parallelly executable. Then, FTG1/FTG2 and FTG3/FTG4 are made to follow respective branch directions in an OR relationship of the conditional branch of BB7.

Therefore, in FIG. 3/STEP020, the fusion element 113 determines that there are parallelly executable tasks or task groups in the task groups to be fused, makes one duplication of the reference task BB7 in FIG. 3/STEP022, and sets it as ST2 (where the name of the original reference task BB7 is changed to ST1). Then, in FIG. 3/STEP024, the arithmetic processing element 110 makes FTG1 follow one branch direction of the reference task ST1 newly generated, makes FTG4 follow a branch direction different from the one branch direction, makes FTG2 follow a branch direction corresponding to the one branch direction of the reference task ST2, and makes FTG3 follow a branch direction corresponding to the branch direction different from the one branch direction. Here, when the branch direction of the conditional branch of ST1 is a direction to execute FTG1, the branch direction of the conditional branch of ST2 becomes a direction to execute FTG2, while when the branch direction of the conditional branch of ST1 is a direction to execute FTG4, the branch direction of the conditional branch of ST2 becomes a direction to execute FTG3.

Figure 17B:
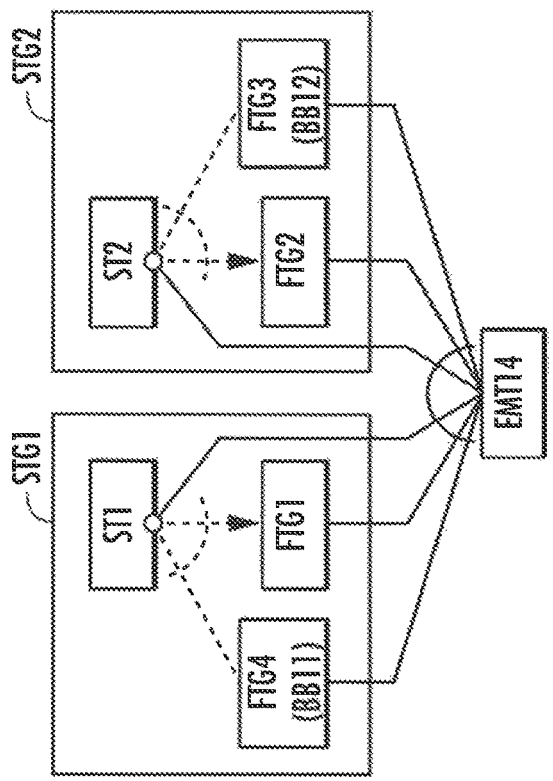
FIGS. 17A-17B are descriptive diagrams related to the duplication of a conditional branch included in a reference task based on the second example of the MTG of FIG. 15, where
Figure 17A:
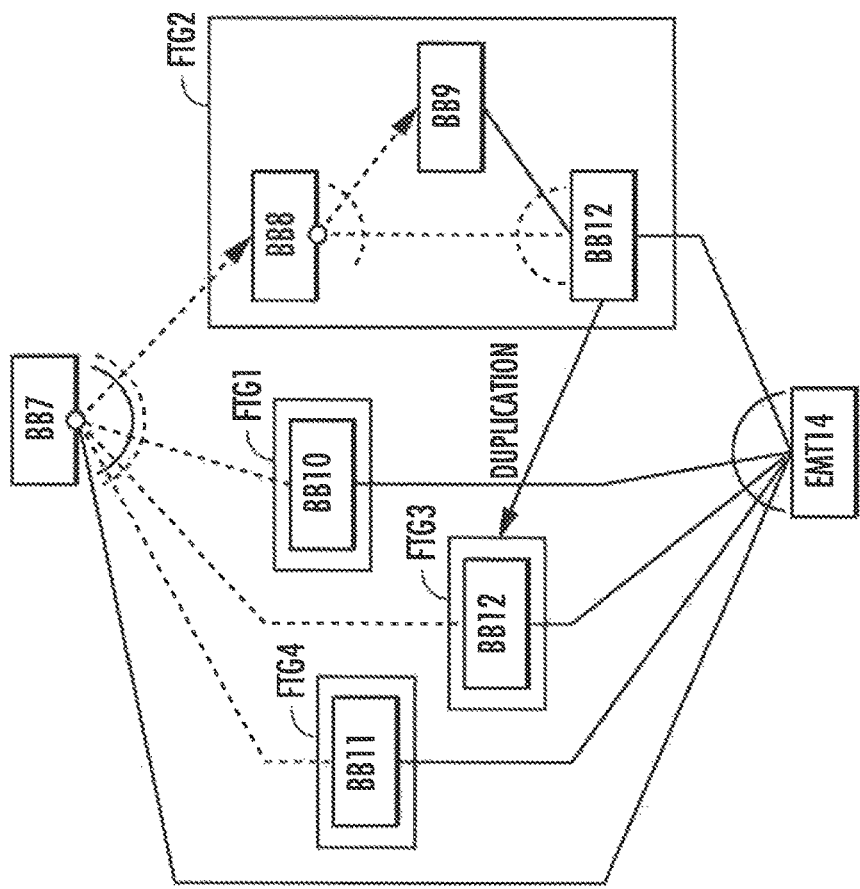

Next, the arithmetic processing element 110 (the fusion-target task group determination element 116) returns the processing to FIG. 3/STEP014, passes through STEP016, and performs the fusion-target task group determination processing once again in STEP018. Thus, the reference task ST1, and the subsequent task groups FTG1 and FTG4 become one fusion-target task group STG1, and the other fusion-target task group STG2 composed of the reference task ST2, and the subsequent task groups FTG2 and FTG3 is generated. The results are illustrated in the MTG of FIG. 17B. In this case, the fusion-target task group STG1 may be composed of ST1, FTG1 and FTG3, and the fusion-target task group STG2 may be composed of ST2, FTG2 and FTG4. In other words, it is only necessary to configure parallelly executable, subsequent task groups not to be included in the same task group to be fused.

Subsequently, the arithmetic processing element 110 (the condition determination element 117 and the fusion element 113) determines, in FIG. 3/STEP020, whether there are further parallelly executable tasks in the fusion-target task groups STG1 and STG2, and when determining that such tasks do not exist, the arithmetic processing element 110 performs fusion processing on STG1 and STG2 (FIG. 3/STEP026). In other words, STG1 and STG2 are task block3 and block4 respectively generated by fusion.

While the fusion-target task groups including the reference task BB7 are described above, the same processing can also be performed on the fusion-target task groups including the reference task BB1. In other words, the MTG in FIG. 17A and FIG. 17B can also be applied to the fusion-target task groups including BB1 by making BB7 corresponding to BB1, BB8 corresponding to BB2, BB9 corresponding to BB3, BB10 corresponding to BB4, BB11 corresponding to BB5, and BB12 corresponding to BB6. As a result, task block5 and block6 are generated by fusion.

Figure 18B:
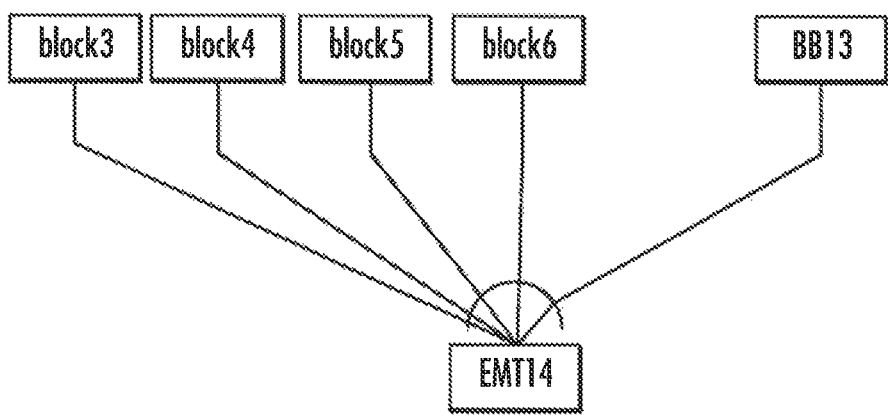

To summarize the above, the MTG in FIG. 15 becomes as illustrated in FIG. 18B as a result of the fusion processing. From this figure, it is found that the number of parallelly executable tasks when the processing STEP20 to STEP026 in FIG. 3 including the duplication of a reference task is performed on the MTG of FIG. 15 is five, which is also smaller than that in the case of FIG. 14A. This results from the program characteristics represented in FIG. 6 and FIG. 12.

(Operational Advantages)

According to the parallelization compiler C of the embodiment, the parallelization compiling apparatus 100 (computer) can apply, to sequential programs represented by the MFGs of FIG. 6 and FIG. 12, the task fusion processing technique for parallelization in STEP002 to STEP032 of FIG. 2 and FIG. 3, especially in STEP018 to STEP026 as the features of the present invention to generate MTGs illustrated in FIG. 14A/FIG. 14B and FIG. 18A/FIG. 18B, respectively. Here, the figures with A suffixed to the figure number indicate MTGs generated by the processing flow of FIG. 2. Similarly, the figures with B suffixed to the figure number indicate MTGs generated by the processing flow of FIG. 3.

Figure 14C:
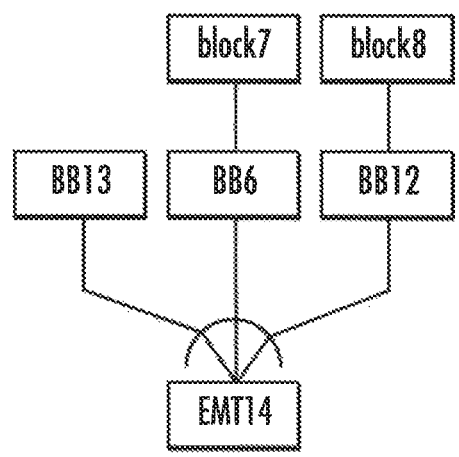
Figure 18C:
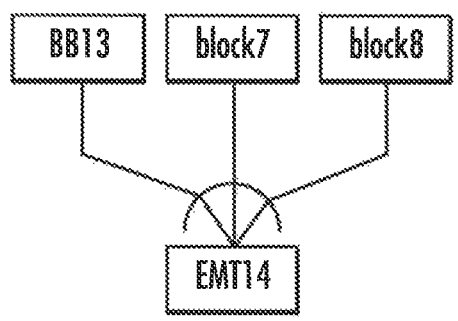

Further, MTGs generated by applying the fusion technique of Patent Literature 1 as the conventional technique to the MFGs in FIG. 6 and FIG. 12 are illustrated in FIG. 14C and FIG. 18C, respectively.

First, in comparison among FIGS. 14A, 14B, and 14C, the number of parallelly executable tasks in FIG. 14A is five (among them, the number of tasks generated by fusion is two), while the number of parallelly executable tasks in FIG. 14C is three (by the same token, two). Thus, when the present invention (example of FIG. 2) is applied, the number of parallelly executable tasks increases. Further, the number of parallelly executable tasks in FIG. 14B is seven (by the same token, four), and it is found that, when the present invention (example of FIG. 3), in which the duplication technique of a conditional branch is combined, is applied, the number of parallelly executable tasks further increases.

Further, like among FIGS. 14A, 14B, and 14C, in comparison among FIGS. 18A, 18B, and 18C, the number of parallelly executable tasks is three in the example of FIG. 18A, five in the example of FIG. 18B, and three in the example of FIG. 18C. Thus, when the processing flow of FIG. 3 is applied (FIG. 18B), the number of parallelly executable tasks is the largest. Then, when the processing flow of FIG. 2 is applied (FIG. 18A), the number of parallelly executable tasks is the same as that when the technique of Patent Literature 1 is applied (FIG. 18C). When both are applied to the sequential program represented by the MFG of FIG. 12, block1 and block2 in the example of FIG. 18A and block7 and block8 in the example of FIG. 18C are the same tasks, respectively. This difference between FIG. 14A and FIG. 14C results from a difference from the configuration of the sequential program as the parallelization target represented by the MFG of FIG. 6. Thus, the number of parallelly executable tasks extracted by the fusion processing may be the same as that in the conventional technique depending on the configuration of the sequential program as the parallelization target, but the number never falls below that of the conventional technique.

As can be seen from the above summary, according to the parallelization compiler of the present invention, the possibility of extracting parallelly executable tasks is not undermined unlike the conventional technique.

(Variations)

In FIG. 2/STEP026, the MTG after task fusion is generated. However, data dependency or the like may be analyzed again at this time, or the MTG after task fusion may be generated based on the data dependency relationship or the like before the task fusion. Suppose that there is a task (called task T2) on which any task (called task T1) included in a task group before fusion is data dependent. In this case, a new task (hereinafter called task T3) generated by fusing the task group is also data dependent on task T2. Use of such a relationship eliminates the need to analyze the data dependency between tasks again after the fusion.

(Comparison with Patent Literature 1)

Figure 16:
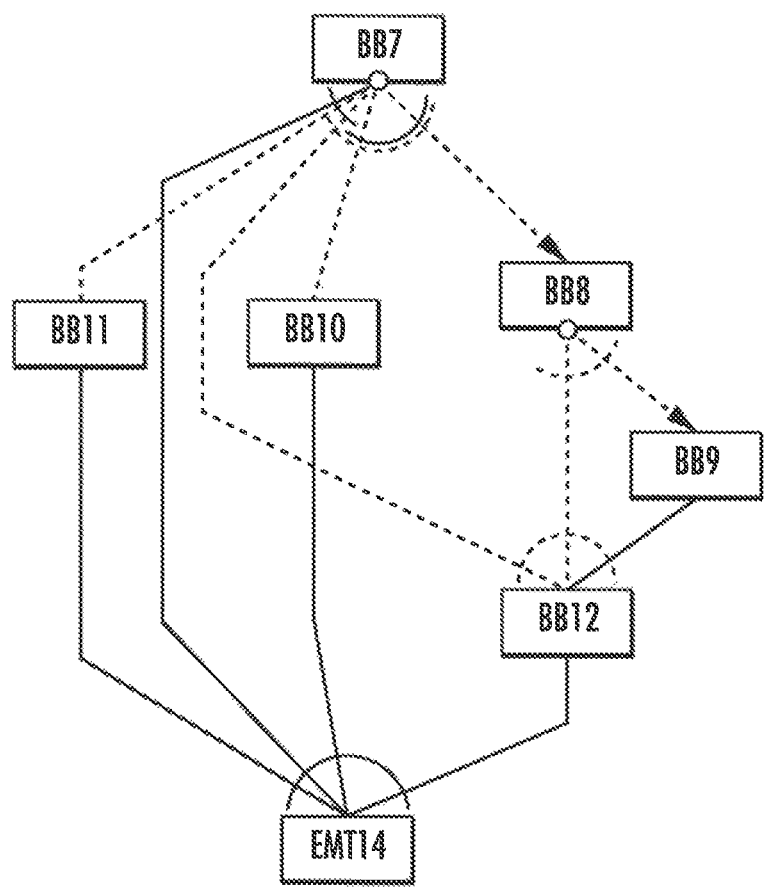
FIG. 16 is a diagram in which part of the MTG of FIG. 15 is extracted to describe the flowchart of FIG. 9.
Figure 19:
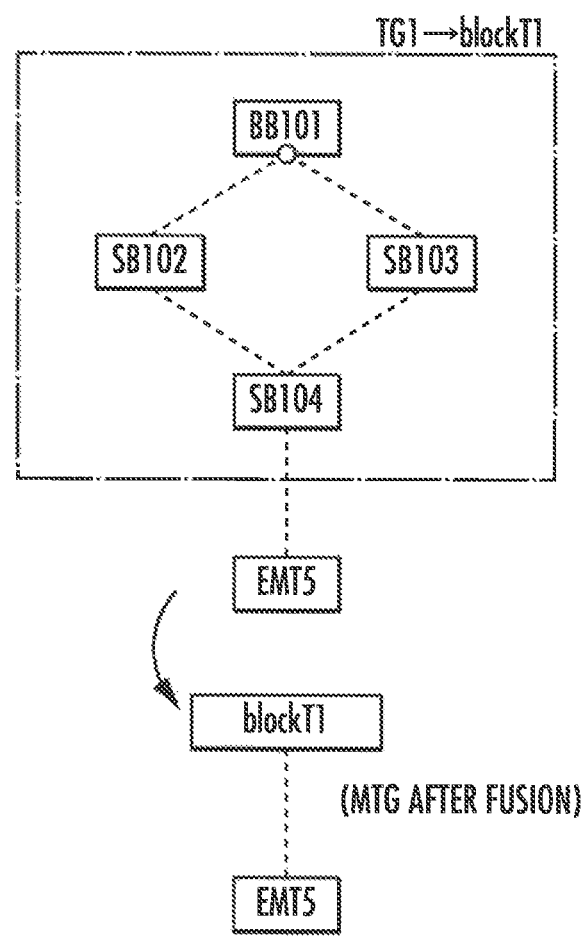
FIG. 19 is a diagram illustrating an MFG to describe the principle of a fusion method of Patent Literature 1.

Although the superiority of the present invention over Patent Literature 1 is fully described above, the superiority of the present invention over Patent Literature 1 is described concisely once again with reference to an MFG of a simple sequential program composed of four tasks as illustrated in FIG. 19 and an MTG generated from the MFG of FIG. 16 as illustrated in FIG. 20.

Note first that the technique of Patent Literature 1 and the technique of the present invention both have the same purpose in terms of eliminating the need for scheduling processing upon program execution by fusing a conditional branch and all tasks subsequent to all branch directions of the conditional branch, respectively, into one task and assigning the task to one processing element in the multiprocessor system (static scheduling). As described above, since fusing such a task group including the conditional branch into one task makes the conditional branch in the task invisible by the fusion, this is called "hiding of the conditional branch."

However, there is a difference between Patent Literature 1 and the present invention in terms of the range of tasks to be fused. The latter has a big advantage of being easy to extract the task group to be fused and any other task having no dependency relationship as parallelly executable tasks. The fundamental principle is described based on the above-described examples.

According to the technique of Patent Literature 1 (the technique described in "Description of the Related Art" in this specification), task BB101 having processing for branching to different tasks is identified as a start task in the MFG of FIG. 19 based on the control dependency (corresponding to "control flow" in this specification) between respective tasks, and SB104 as any one of tasks executed in common in all of plural processes of a series of processing to be executed sequentially by using the start task BB101 as a start point is identified as an end task.

Then, in the technique of Patent Literature 1, four tasks, i.e., the identified start task BB101, the identified end task SB104 in the processing using the start task as the start point, and all tasks SB102 and SB103 to be executed after the execution of the start task BB101 and before the execution of the end task SB104 are fused as new one task. In other words, tasks to be fused in Patent Literature 1 are a task group TG1 surrounded by the dot-and-dash line in FIG. 19, and when these tasks are fused, a new task blockT1 is generated as illustrated in FIG. 19. Then, an MTG after task fusion is also illustrated in FIG. 19.

On the other hand, according to the present invention, the earliest executable condition analysis in FIG. 2/STEP014 is performed after the MFG illustrated in FIG. 19 is generated in FIG. 2/STEP012.

In the MFG illustrated in FIG. 19, the subroutine block SB102 is control dependent on the branch direction $BB101_{102}$ of the conditional branch of the basic block BB101. Further, the subroutine block SB103 is control dependent on the branch direction $BB101_{103}$ of the conditional branch of the basic block BB101.

However, since the subroutine block SB104 is executed even though the branch direction of the conditional branch of the basic block BB101 is either the branch direction $BB101_{102}$ or the branch direction $BB101_{103}$, the subroutine block SB104 is not control dependent and indirect control dependent on the branch directions $BB101_{102}$ and $BB101_{103}$ of the conditional branch of the basic block BB101. Further, since the subroutine block SB104 is not data dependent on the subroutine blocks SB102 and SB103, the subroutine block SB104 is extended-control dependent on neither of the branch directions $BB101_{102}$ and $BB101_{103}$ of the conditional branch of the basic block BB101.

Based on the earliest executable condition analysis, the MTG illustrated in FIG. 17 is generated in FIG. 2/STEP016.

Then, in STEP202 of FIG. 9 illustrating the detailed flow of STEP018 in FIG. 2 to determine a task group to be fused, the task BB101 is identified as the reference task. Then, in FIG. 9/STEP204, the tasks SB102 and SB103 control dependent, indirect control dependent, or extended-control dependent on the conditional branch of the task BB101 are identified as first subsequent tasks, and the reference task BB101 the first subsequent tasks SB102, SB103 are identified as the task group. In the case of the MFG of FIG. 19, there is no task having a dependency relationship (data dependency and control dependency) with the task group. In other words, tasks to be fused in the present invention ("a task group to be fused" in this specification") becomes a task group TG2 surrounded by the two-dot chain line in FIG. 20.

On the other hand, as described above, the subroutine block SB104 is not control dependent, indirect control dependent, and extended-control dependent on any of the branch directions of the conditional branch of the basic block BB101. Therefore, the subroutine block SB104 is not included in the task group to be fused in determining the task group to be fused in FIG. 2/STEP018.

Then, in FIG. 2/STEP026, the task group TG2 to be fused is fused to generate a new task blockT2. As described above, the subroutine block SB104 is not included in the task group TG2. Therefore, an MTG after fusion is as illustrated in FIG. 20.

In comparison between the MTGs after the fusion in FIG. 19 and FIG. 20, it is apparent that the number of parallelly executable tasks to be extracted is one in the technique of Patent Literature 1 (FIG. 19) and two in the parallelization technique of this specification (FIG. 20). Thus, according to the present invention, parallelism can be extracted more properly than Patent Literature 1.

EXPLANATION OF NUMERAL REFERENCES

100 . . . compiling apparatus, 110 . . . arithmetic processing element, 120 . . . reading device, 130 . . . writing device, 140 . . . storage device, 200 . . . multiprocessor system, 210 . . . centralized shared memory, 220 . . . input/output device, C . . . parallelization compiler, PE1 . . . first processing element, PE2 . . . second processing element, PEn . . . n-th processing element, P1 . . . sequential program, CF . . . configuration file, P2 . . . parallel program, PB . . . binary code.

What is claimed is:

1. A computer-implemented method for generating, from a sequential program, a parallel program executable in a system including a plurality of arithmetic processing units to perform arithmetic processing in parallel, the method comprising:
dividing the sequential program into a plurality of tasks;
first analyzing the plurality of tasks to determine data dependency and control dependency of each of the plurality of tasks;
second analyzing an earliest executable condition of each of the plurality of tasks based on the data dependency between respective tasks and the control dependency of each task obtained from the first analyzing; and
determining, based on results of the second analyzing, as a task group to be fused, a task group including, among the plurality of tasks, a reference task as a task having a conditional branch, and all subsequent tasks as tasks control dependent, extended-control dependent, or indirect control dependent on respective of all branch directions of the conditional branch included in the reference task, and fusing, as a new task, the task group to be fused,
wherein the earliest executable conditions for an i-th task MTi are:
the conditional branch of a i-th task MTi on which the i-th task MTi is control dependent branches to a path including the i-th task MTi; and
a k-th task MTk (k≠i) on which the i-th task MTi is data dependent is fully completed, or non-execution of the k-th task MTk is determined.

2. The method according to claim 1, further comprising:
scheduling to assign each of a plurality of tasks including the new task to each of the plurality of arithmetic processing units based on the data dependency; and
generating the parallel program based on the scheduling results.

3. The method according to claim 1, wherein the determining includes
identifying a task group including the reference task, and all first subsequent tasks as tasks control dependent or extended-control dependent on respective of all the branch directions of the conditional branch included in the reference task;
adding, to the task group, all second subsequent tasks as tasks control dependent or extended-control dependent on respective of all branch directions of conditional branches included in the task group;
repeating the adding until tasks control dependent or extended-control dependent on any of the branch directions of the conditional branches included in the task group run out; and
determining the task group to be a task group to be fused.

4. The method according to claim 1, further comprising:
determining whether a plurality of tasks control dependent, indirect control dependent, or extended-control dependent on one branch direction of the conditional branch included in the reference task included in the task group to be fused satisfy a predetermined condition including such a parallelly executable condition as to have no control dependency, indirect control dependency, extended-control dependency, and data dependency on one another; and
when the predetermined condition is determined not to be satisfied, fusing the task group to be fused as the new task, or
when the predetermined condition is determined to be satisfied, duplicating the conditional branch included in the reference task, making the plurality of tasks having no control dependency, indirect control dependency, extended-control dependency, and data dependency on one another follow respective of a plurality of conditional branches including the duplicated conditional branch, and combining each of the plurality of conditional branches with the plurality of tasks, each of which is made to follow each of the plurality of conditional branches to generate a plurality of task groups, determining the plurality of task groups as a new plurality of task groups to be fused, and fusing, as the new task, each of the plurality of tasks groups to be fused.

5. The method according to claim 1, wherein the second analyzing includes simplifying the earliest executable condition of each of the plurality of tasks by excluding a case that includes an earliest executable condition that is also included as the earliest executable condition of another case.

6. A parallelization compiling apparatus configured to generate, from a sequential program, a parallel program executable in a system including a plurality of arithmetic processing units to perform arithmetic processing in parallel, the parallelization compiling apparatus comprising at least one processor configured to function as:
a task division element which divides the sequential program into a plurality of tasks,
a dependency analysis element which analyzes the plurality of tasks divided by the task division element to determine data dependency and control dependency of each of the plurality of tasks;
an earliest executable condition analysis element which analyzes an earliest executable condition of each of the plurality of tasks based on the data dependency between respective tasks and the control dependency of each task obtained from the dependency analysis element; and
a fusion element which determines, based on results of the earliest executable condition analysis element, as a task group to be fused, a task group including, among the plurality of tasks, a reference task as a task having a conditional branch, and all subsequent tasks as tasks control dependent, extended-control dependent, or indirect control dependent on respective of all branch directions of the conditional branch included in the reference task, and fuses the task group to be fused as a new task, wherein the earliest executable conditions for an i-th task MTi are:
the conditional branch of a i-th task MTi on which the i-th task MTi is control dependent branches to a path including the i-th task MTi; and
a k-th task MTk (k≠i) on which the i-th task MTi is data dependent is fully completed, or non-execution of the k-th task MTk is determined.

7. A non-transitory computer-readable medium having stored thereon computer-readable instructions to cause a computer to execute a process to generate, from a sequential program, a parallel program executable in a system including a plurality of arithmetic processing units to perform arithmetic processing in parallel, the process comprising:
dividing the sequential program into a plurality of tasks;
first analyzing the plurality of tasks divided to determine data dependency and control dependency of each of the plurality of tasks;
second analyzing an earliest executable condition of each of the plurality of tasks based on the data dependency between respective tasks and the control dependency of each task obtained from the first analyzing; and
determining, based on results of the second analyzing, as a task group to be fused, a task group including, among the plurality of tasks, a reference task as a task having a conditional branch, and all subsequent tasks as tasks control dependent, extended-control dependent, or indirect control dependent on respective of all branch directions of the conditional branch included in the reference task, and fusing, as a new task, the task group to be fused,
wherein the earliest executable conditions for an i-th task MTi are:
the conditional branch of a i-th task MTi on which the i-th task MTi is control dependent branches to a path including the i-th task MTi; and
a k-th task MTk (k≠i) on which the i-th task MTi is data dependent is fully completed, or non-execution of the k-th task MTk is determined.

8. The non-transitory computer-readable storage medium according to claim 7, the process further comprising:
scheduling to assign each of a plurality of tasks including the new task to each of the plurality of arithmetic processing units based on the data dependency; and
generating the parallel program based on the scheduling results.

9. The non-transitory computer readable storage medium according to claim 7, wherein the determining includes
identifying a task group including the reference task, and all first subsequent tasks as tasks control dependent or extended-control dependent on respective of all the branch directions of the conditional branch included in the reference task;
adding, to the task group, all second subsequent tasks as tasks control dependent or extended-control dependent on respective of all branch directions of conditional branches included in the task group;
repeating the adding until tasks control dependent or extended-control dependent on any of the branch directions of the conditional branches included in the task group run out; and
determining the task group to be a task group to be fused.

10. The non-transitory computer readable storage medium according to claim 7, the process further comprising:
determining whether a plurality of tasks control dependent, indirect control dependent, or extended-control dependent on one branch direction of the conditional branch included in the reference task included in the task group to be fused satisfy a predetermined condition including such a parallelly executable condition as to have no control dependency, indirect control dependency, extended-control dependency, and data dependency on one another; and
when the predetermined condition is determined not to be satisfied, fusing the task group to be fused as the new task, or
when the predetermined condition is determined to be satisfied, duplicating the conditional branch included in the reference task, making the plurality of tasks having no control dependency, indirect control dependency, extended-control dependency, and data dependency on one another follow respective of a plurality of conditional branches including the duplicated conditional branch, and combining each of the plurality of conditional branches with the plurality of tasks, each of which is made to follow each of the plurality of conditional branches to generate a plurality of task groups, determining the plurality of task groups as a new plurality of task groups to be fused, and fusing, as the new task, each of the plurality of tasks groups to be fused.

11. The non-transitory computer-readable storage medium according to claim 7, wherein the second analyzing includes simplifying the earliest executable condition of each of the plurality of tasks by excluding a case that includes an earliest executable condition that is also included as the earliest executable condition of another case.

* * * * *